United States Patent
Haartsen et al.

(10) Patent No.: US 8,155,055 B2
(45) Date of Patent: Apr. 10, 2012

(54) AUTOMATIC RE-CONNECTION OF A PREVIOUSLY LOST CONNECTION IN A FREQUENCY HOPPING COMMUNICATION SYSTEM

(75) Inventors: Jacobus Cornelis Haartsen, Hardenberg (NL); Geert Hendrik Weinans, Klijndijk (NL)

(73) Assignee: Sony Ericsson Mobile Communications AB, Lund (SE)

( * ) Notice: Subject to any disclaimer, the term of this patent is extended or adjusted under 35 U.S.C. 154(b) by 616 days.

(21) Appl. No.: 11/954,106

(22) Filed: Dec. 11, 2007

(65) Prior Publication Data

US 2009/0073870 A1 Mar. 19, 2009

Related U.S. Application Data

(60) Provisional application No. 60/972,268, filed on Sep. 14, 2007.

(51) Int. Cl.
*H04W 4/00* (2009.01)
(52) U.S. Cl. ....... 370/328; 370/216; 370/338; 455/41.2; 455/458
(58) Field of Classification Search ................ 370/216, 370/331, 352, 328, 400, 465, 480, 252, 338, 370/350, 329, 253; 455/458, 41.2, 509, 451, 455/552.1, 557, 11.1, 410, 428, 462, 507, 455/343.1, 500, 456.3, 313
See application file for complete search history.

(56) References Cited

U.S. PATENT DOCUMENTS

| | | | |
|---|---|---|---|
| 5,940,431 | A | 8/1999 | Haartsen et al. |
| 7,340,215 | B2 * | 3/2008 | Yokoshi et al. ............. 455/41.2 |
| 7,454,171 | B2 * | 11/2008 | Palin et al. .................. 455/41.2 |
| 2002/0176445 | A1 * | 11/2002 | Melpignano ................. 370/480 |
| 2003/0060161 | A1 * | 3/2003 | Park ............................... 455/41 |
| 2003/0099207 | A1 * | 5/2003 | Yamato ......................... 370/280 |
| 2003/0152110 | A1 * | 8/2003 | Rune ............................. 370/509 |
| 2004/0057499 | A1 * | 3/2004 | Haartsen ...................... 375/136 |
| 2006/0111187 | A1 * | 5/2006 | Miyazaki ........................ 463/40 |
| 2006/0128308 | A1 * | 6/2006 | Michael et al. ............. 455/41.2 |
| 2006/0280143 | A1 * | 12/2006 | Dabak et al. ................. 370/329 |
| 2007/0047506 | A1 * | 3/2007 | Froehling et al. ............. 370/338 |
| 2007/0140253 | A1 | 6/2007 | Daigle |

(Continued)

FOREIGN PATENT DOCUMENTS

| | | |
|---|---|---|
| WO | 98/28926 | 7/1998 |
| WO | 02/089410 | 11/2002 |
| WO | 2004/038938 | 5/2004 |
| WO | 2006/013310 | 2/2006 |

OTHER PUBLICATIONS

International Search Report and Written Opinion from corresponding Application No. PCT/EP2008/051142 mailed Jun. 5, 2008.
Bluetooth Specification v.2.0+EDR; www.bluetooth.org.
International Preliminary Report on Patentability from corresponding Application No. PCT/EP2008/051142 mailed Dec. 21, 2009.

*Primary Examiner* — Aung S Moe
*Assistant Examiner* — Abdullah Riyami
(74) *Attorney, Agent, or Firm* — Renner, Otto, Boissell & Sklar, LLP

(57) ABSTRACT

This disclosure relates to frequency hopping (FH) communication systems, such as Bluetooth. In particular, it relates to a substantially automatic recovery procedure for re-establishing a previously lost link or connection between a master unit and a slave unit in a frequency hopping communications system. Some embodiments of the disclosed invention relates to methods for recovery of a previously lost link or connection between two Bluetooth units in a Bluetooth Sniff mode.

56 Claims, 10 Drawing Sheets

U.S. PATENT DOCUMENTS

| | | | |
|---|---|---|---|
| 2007/0173270 A1* | 7/2007 | Block et al. | 455/507 |
| 2007/0275746 A1* | 11/2007 | Bitran | 455/509 |
| 2007/0287381 A1* | 12/2007 | Hulvey | 455/41.2 |
| 2007/0287542 A1* | 12/2007 | Miyazaki et al. | 463/39 |
| 2008/0102861 A1* | 5/2008 | Linsky et al. | 455/458 |
| 2009/0003307 A1* | 1/2009 | Yang et al. | 370/350 |

* cited by examiner

| State | Max. latency (s) | Min. latency (s) |
|---|---|---|
| "3 ID slow recovery" | 56 | 28 |
| "2 ID slow recovery" | 59 | 30 |
| Bluetooth page | 21 | 11 |

| State | Max. latency (s) | Min. latency (s) |
|---|---|---|
| Option 1 | 10 | 5 |
| Option 2 | 24 | 12 |
| Bluetooth page | 2.56 | 1.28 |

AUTOMATIC RE-CONNECTION OF A PREVIOUSLY LOST CONNECTION IN A FREQUENCY HOPPING COMMUNICATION SYSTEM

CROSS REFERENCE TO RELATED APPLICATION

This application claims priority under 35 U.S.C. §119 to U.S. Provisional Application No. 60/972,268, filed Sep. 14, 2007, the entire disclosure of which is incorporated herein by reference.

TECHNICAL FIELD

The present invention relates generally to the field of mobile communication systems and, more particularly, to frequency hopping (FH) communication systems, such as Bluetooth. In particular, the invention relates to the recovery or re-establishment of a previously lost link or connection between a master unit and a slave unit in a frequency hopping communications system. Some embodiments of the invention relate to low power modes of Bluetooth, such as the Bluetooth sniff mode. Particularly, some embodiments of the invention relate to methods and devices for recovering a previously lost link or connection between two Bluetooth units in the Bluetooth Sniff mode.

DESCRIPTION OF RELATED ART

Bluetooth is a well-known short-range radio technology. The Bluetooth technology makes it possible to transmit signals over short distances between e.g. mobile telephones, portable computers and other Bluetooth enabled units and thereby simplify communication and synchronization between such units. A Bluetooth system may provide a point-to-point connection or a point-to-multipoint connection. In the point-to-multipoint connection, a channel may be shared among several Bluetooth units. Two or more units sharing the same channel form a piconet. One Bluetooth unit generally acts as the master unit of the piconet, whereas the other unit(s) acts as slave unit(s). Up to e.g. seven slave units may be active in the piconet. In addition, many more slave units may remain locked to the master unit in a so-called parked state. These parked slave units cannot be active on the common channel, but may remain synchronized to the master unit. Both for active and parked slave units, the channel access is generally controlled by the master unit. Units may also be in a hold mode or a sniff mode. The hold, sniff and parked modes are low-power power modes defined in the Bluetooth specification; see e.g. the Bluetooth specification v.2.0+EDR accessible via www.bluetooth.org.

To establish a connection in Bluetooth, a sending unit and a receiving unit generally have to synchronize both in time and in frequency. For connection establishment, a paging procedure may be used in which the sending unit sends a short identification packet on many different frequencies, e.g. as is described in U.S. Pat. No. 5,940,431 to Haartsen et. al. The receiving unit applies a low duty cycle scanning, that is, it scans a single frequency for approximately 10 milliseconds every second. For each new scan, a new hop frequency is selected. The FH may provide the required robustness in a multi-path fading and interference-prone environment.

The initial synchronization may incur some delay (typically 1-2 seconds in an error-free environment but longer in an error-prone environment) and may also require quite some effort (i.e. power consumption) from the sending unit (pager) and the receiving unit (scanner). Therefore, units in e.g. a Wireless Personal Area Network (WPAN) are normally not disconnected once synchronized, even if there is (temporarily) no data to be exchanged. From a power consumption perspective, it may be more advantageous to keep the units locked. Synchronization may be maintained in a low-power power and the data exchange can be continued quickly without too much power consumption from the units. In the Bluetooth Sniff mode, every 1.28 s, a slave unit wakes up for a short time period. During this period, a master unit sends a (POLL) packet. This packet can be used by the slave unit to resynchronize its clocks. The units can maintain in time and frequency synchronization by periodically exchanging a packet for re-synchronization. The interval between re-synchronization instances generally depends on the mutual drift between the clocks in the master unit and the slave unit. The low-power link can normally be maintained as long as the units are in range with each other. Once the units move out of said range, the link is released after a link supervision timeout (typically only a few seconds). Once released, the link can only be re-established by using a conventional page procedure. The slave unit enters a page_scan state and the master unit enters a page state. Since the page normally requires quite a lot power from the master unit, the page is only carried out for a limited period of time: if the "lost" slave unit is not found within 10 seconds, the master unit normally gives up and enters the page_scan state as well. This means that the link will not be recovered automatically when the units come in range again, unless the interruption lasts less than the mentioned 10 seconds. In the known prior art, a user action is therefore generally required to connect the units again. Hence, after loss of the link or connection in Bluetooth, an action from the user is normally required for achieving re-establishment of a previously lost connection.

SUMMARY OF THE INVENTION

With the above and following description in mind, then, an aspect of the present invention is to provide improved methods, procedures and/or devices, which seek to mitigate, alleviate, or eliminate one or more of the above-identified deficiencies in the art and disadvantages singly or in any combination.

An aspect of the present invention relates to a method performed by a master unit for recovering a previously lost connection between said master unit and a slave unit in a frequency hopping communications system, the method comprising:

causing the master unit to enter a first recovery state, which includes:
repeatedly transmitting at least one ID packet from the master unit to the slave unit until a response is received from the slave unit or until a maximum time period $T_{FASTRECOVERY}$ of the first recovery state has elapsed, and
gradually increasing the number of ID packets that are repeatedly transmitted from the master unit to the slave unit as time progresses.

In one embodiment, if the maximum time period $T_{FASTRECOVERY}$ of the first recovery state has elapsed, the method further comprises:

causing the master unit to enter a second recovery state, which includes:
fixing the number of ID packets that are repeatedly transmitted from the master unit to the slave unit as time progresses to a maximum number of ID packets; and repeatedly transmitting the fixed number of ID packets from the master unit to the slave unit until a response is received from the slave unit.

In one embodiment, the step of causing the master unit to enter the first recovery state begins immediately after a loss of connection between the master unit and the slave unit has been detected.

In one embodiment, the initial timing of transmitting the at least one ID packet is determined based on former anchor point timing during the previous connection between the master unit and the slave unit.

In one embodiment, the at least one ID packet is associated with the identity of said slave unit.

In one embodiment, the step of gradually increasing the number of ID packets that are repeatedly transmitted from the master unit to the slave unit as time progresses is performed until a maximum number of ID packets is reached.

In one embodiment, the method comprises gradually increasing a number $N_{rp}$ of master-to-slave slots as time progresses, wherein each master-to-slave slot comprises the at least one ID packet, whereby the number $N_{rp}$ of master-to-slave slots each comprising the at least one ID packet is increased and thereby also the number of ID packets that are repeatedly transmitted from the master unit to the slave unit is increased as time progresses.

In one embodiment, the number $N_{rp} \geq 1$, and the number $N_{rp}$ of master-to-slave slots is gradually increased until a maximum number $N_{rp}$ of master-to-slave slots is reached. In one embodiment, the maximum number $N_{rp}$ of master-to-slave slots equals 15. In another embodiment, the maximum number $N_{rp}$ of master-to-slave slots equals 127.

In one embodiment, a timing selection and/or a frequency selection is performed based on clock information of the master unit from the last synchronization of the respective clocks of the master unit and the slave unit during the previous connection.

In one embodiment, the clock information utilized by the master unit is the same as the clock information utilized by the master unit during the last synchronization of the respective clocks of the master unit and slave unit during the previous connection.

In one embodiment, the frequency hopping communications system is a Bluetooth system in Bluetooth Sniff mode.

The different features of the above-mentioned embodiments can be combined in any combination.

Another aspect of the invention relates to a master unit for recovering a previously lost connection between said master unit and a slave unit in a frequency hopping communications system, the master unit comprising:

means for causing the master unit to enter a first recovery state;

means for repeatedly transmitting at least one ID packet from the master unit to the slave unit until a response is received from the slave unit or until a maximum time period $T_{FASTRECOVERY}$ of the first recovery state has elapsed, and means for gradually increasing the number of ID packets that are repeatedly transmitted from the master unit to the slave unit as time progresses.

In one embodiment, the master unit comprises:

means for causing the master unit to enter a second recovery state when the maximum time period $T_{FASTRECOVERY}$ of the first recovery state has elapsed;

means for fixing the number of ID packets that are repeatedly transmitted from the master unit to the slave unit as time progresses to a maximum number ID packets; and means for repeatedly transmitting the fixed number of ID packets from the master unit to the slave unit until a response is received from the slave unit.

In one embodiment, the means for causing the master unit to enter a first recovery state is configured to begin its operation immediately after a loss of connection between the master unit and the slave unit has been detected.

In one embodiment, the master unit comprises means for determining an initial timing for transmitting the at least one ID packet, wherein the initial timing is determined based on former anchor point timing during the previous connection between the master unit and the slave unit.

In one embodiment, the at least one ID packet is associated with the identity of said slave unit.

In one embodiment, the means for gradually increasing the number of ID packets that are repeatedly transmitted from the master unit to the slave unit as time progresses is configured to gradually increase said number of ID packets until a maximum number of ID packets is reached.

In one embodiment, the master unit comprises means for gradually increasing a number $N_{rp}$ of master-to-slave slots as time progresses, wherein each master-to-slave slot comprises the at least one ID packet, whereby the number $N_{rp}$ of master-to-slave slots each comprising the at least one ID packet can be increased and thereby also the number of ID packets that are repeatedly transmitted from the master unit to the slave unit can be increased as time progresses.

In one embodiment, the number $N_{rp} \geq 1$, and the means for gradually increasing the number of $N_{rp}$ of master-to-slave slots is configured to gradually increase said number $N_{rp}$ until a maximum is reached. In one embodiment, the maximum number $N_{rp}$ of master-to-slave slots equals 15. In another embodiment, the maximum number $N_{rp}$ of master-to-slave slots equals 127.

In one embodiment, the master unit comprises means for determining a timing selection and/or a frequency selection by utilizing clock information from the last synchronization of the respective clocks of the master unit and the slave unit during the previous connection.

In one embodiment, the clock information utilized by the master unit is the same as the clock information utilized by the master unit during the last synchronization of the respective clocks of the master unit and slave unit during the previous connection.

In one embodiment, the frequency hopping communications system is a Bluetooth system in Bluetooth Sniff mode.

The different features of the above-mentioned embodiments can be combined in any combination.

Yet another aspect of the invention relates to a method performed by a slave unit for assisting in recovering a previously lost connection between said slave unit and a master unit of a frequency hopping communications system, the method comprising the steps of:

causing the slave unit to enter a first recovery state, which includes:

activating the slave unit for a first activation time period, $T_{SCAN}$, out of every first standby time period $T_{STANDBY}$;

during each first activation time period, $T_{SCAN}$, causing the slave unit to monitor a selected channel for receipt of an ID packet from the master unit until said ID packet is received by the slave unit or until a maximum time period $T_{FASTRECOVERY}$ of the first recovery state has elapsed; and if the maximum time period $T_{FASTRECOVERY}$ of the first recovery state has elapsed, the method comprises the further steps of:

causing the slave unit to enter a second recovery state, which includes:

activating the slave unit for a second activation time period, $T_{SCAN}$, out of every second standby time period $T_{STANDBY}$ wherein said second standby time period $T_{STANDBY}$, is different from said first standby time period $T_{STANDBY}$; and during each second activation time period, $T_{SCAN}$, causing the slave unit to monitor a selected channel for receipt of an ID packet from the master unit until said ID packet is received by the slave unit.

In one embodiment, the step of causing the slave unit to enter the first recovery state is performed immediately after a loss of connection between the master unit and the slave unit has been detected.

In one embodiment, the at least one ID packet is associated with the identity of said slave unit.

In one embodiment, an initial timing of the first activation time period, $T_{SCAN}$ is determined by utilizing clock information from a clock of the master unit from the last synchronization of the respective clocks of the master unit and the slave unit during the previous connection.

In one embodiment, the method further comprises:

utilizing the same clock offset as during the last synchronization of the respective clocks of the master unit and the slave unit during the previous connection.

In one embodiment, the first and the second activation time period, $T_{SCAN}$, has a total duration D being defined by two equal durations D/2 on both sides of a duration center C of the duration D, the method further comprising:

selecting the duration center C of said time period, $T_{SCAN}$, to be placed at a former anchor point of a former anchor point timing experienced during the previous connection between the master unit and the slave unit.

In one embodiment, the step of causing the slave unit to enter the second recovery state is performed immediately after the maximum time period $T_{FASTRECOVERY}$ has elapsed.

In one embodiment, during the second recovery state, a fixed offset is applied to the period between two consecutive activation periods, $T_{SCAN}$, in such way that the instances when the activation periods, $T_{SCAN}$, occur begins to slide with respect to former anchor points.

In one embodiment, the method further comprises, during the second recovery state, causing the slave unit to monitor the selected channel for receipt of an ID packet from the master unit until said ID packet is received by the slave unit, wherein the selection of scan frequencies is based on the timing selection of the first standby period.

In one embodiment, the frequency hopping communications system is a Bluetooth system in Bluetooth Sniff mode.

The different features of the above-mentioned embodiments can be combined in any combination.

Still another aspect of the present invention relates to a slave unit for assisting in recovering a previously lost connection between said slave unit and a master unit in a frequency hopping communications system, the slave unit comprising:

means for causing the slave unit to enter a first recovery state;

means activating the slave unit for a first activation time period, $T_{SCAN}$, out of every first standby time period $T_{STANDBY}$; and means for causing the slave unit to monitor a selected channel for receipt of an ID packet from the master unit during each first activation time period, $T_{SCAN}$, until said ID packet is received by the slave unit or until a maximum time period $T_{FASTRECOVERY}$ of the first recovery state has elapsed; and also comprising:

means for causing the slave unit to enter a second recovery state if the maximum time period $T_{FASTRECOVERY}$ of the first recovery state has elapsed;

means for activating the slave unit for a second activation time period, $T_{SCAN}$, out of every second standby time period $T_{STANDBY}$, wherein said second standby time period, $T_{STANDBY}$, is different from said first standby time period $T_{STANDBY}$; and means for causing the slave unit to monitor a selected channel for receipt of an ID packet from the master unit during each second activation time period, $T_{SCAN}$, until said ID packet is received by the slave unit.

In one embodiment, the means for causing the slave unit to enter the first recovery state is configured to begin its operation immediately after a loss of connection between the master unit and the slave unit has been detected.

In one embodiment, the at least one ID packet is associated with the identity of said slave unit.

In one embodiment, the slave unit comprises means for determining an initial timing of the first activation time period, $T_{SCAN}$, by utilizing clock information from a clock of the master unit from the last synchronization of the respective clocks of the master unit and the slave unit during the previous connection.

In one embodiment, the slave unit comprises means for utilizing the same clock offset as during the last synchronization of the respective clocks of the master unit and the slave unit during the previous connection.

In one embodiment, the slave unit comprises:

means for determining the first and the second activation time period, $T_{SCAN}$, to have a total duration D being defined by two equal durations D/2 on both sides of a duration center C of the duration D; and means for selecting the duration center C of said time period, $T_{SCAN}$, to be placed at a former anchor point of a former anchor point timing experienced during the previous connection between the master unit and the slave unit.

In one embodiment, the slave unit comprises means for causing the slave unit to enter the second recovery state immediately after the maximum time period $T_{FASTRECOVERY}$ has elapsed.

In one embodiment, the slave unit comprises means for applying a fixed offset to the period between two consecutive activation periods, $T_{SCAN}$, during the second recovery state, in such way that the instances when the activation periods, $T_{SCAN}$, occur begins to slide with respect to former anchor points.

In one embodiment, the slave unit further comprises means for causing, during the second recovery state, the slave unit to monitor the selected channel for receipt of an ID packet from the master unit until said ID packet is received by the slave unit, wherein the selection of scan frequencies is based on the timing selection of the first standby period.

In one embodiment, the frequency hopping communications system is a Bluetooth system in Bluetooth Sniff mode.

The different features of the above-mentioned embodiments can be combined in any combination.

A further aspect of the invention relates to a method for recovering a previously lost connection between a master unit and a slave unit in a frequency hopping communications system, the method comprising the steps of:

causing the slave unit to enter a first recovery state, which includes:

activating the slave unit for a first activation time period out of every first standby time period;

during each first activation time period causing the slave unit to monitor a selected channel for receipt of an ID packet from the master unit until said ID packet is received by the slave unit or until a maximum time period of the first recovery state has elapsed; and causing the master unit to enter the first recovery state, which includes:

repeatedly transmitting at least one ID packet from the master unit to the slave unit until a response is received from the slave unit or until the maximum time period of the first recovery state has elapsed, wherein the number of ID packets that are repeatedly transmitted from the master unit to the slave unit are gradually increased as time progresses; wherein if the maximum time period of the first recovery state has elapsed, the method additionally comprises the steps of:

causing the slave unit to enter a second recovery state, which includes:

activating the slave unit for a second activation time period out of every second standby time period, wherein said second standby time period is different from said first standby time period;

during each second activation time period causing the slave unit to monitor a selected channel for receipt of an ID packet from the master unit until said ID packet is received by the slave unit; and causing the master unit to enter the second recovery state, which includes:

repeatedly transmitting at least one ID packet from the master unit to the slave unit, until a response is received from the slave unit.

In one embodiment, the method further comprises during the second recovery state:

fixing the number of ID packets that are repeatedly transmitted from the master unit to the slave unit as time progresses to a maximum number of ID packets.

In one embodiment, the step of causing the slave unit to enter the first recovery state is performed immediately after a loss of connection between the master unit and the slave unit has been detected.

In one embodiment, the step of causing the master unit to enter the first recovery state is performed immediately after a loss of connection between the master unit and the slave unit has been detected.

In one embodiment, an initial timing selection and/or frequency selection of the first activation time period, $T_{SCAN}$, is determined by utilizing clock information from the last synchronization of the respective clocks of the master unit and the slave unit during the previous connection.

In one embodiment, the clock information utilized by the master unit is the same as the clock information utilized by the master unit during the last synchronization of the respective clocks of the master unit and slave unit during the previous connection.

In one embodiment, the slave unit is caused to utilize the same clock offset as during the last synchronization of the respective clocks of the master unit and the slave unit during the previous connection.

In one embodiment, the first activation time period, $T_{SCAN}$, has a total duration D being defined by two equal durations D/2 on both sides of a duration center C of the duration D, the method further comprising:

selecting the duration center C of said time period, $T_{SCAN}$, to be placed at a former anchor point of a former anchor point timing experienced during the previous connection between the master unit and the slave unit.

In one embodiment, a number $N_{rp}$ of master-to-slave slots is gradually increased as time progresses, where each master-to-slave slot comprises the at least one ID packet, whereby the number $N_{rp}$ of master-to-slave slots each comprising the at least one ID packet is increased and thereby also the number of ID packets that are repeatedly transmitted from the master unit to the slave unit is increased as time progresses.

In one embodiment, the number $N_{rp} \geq 1$, and the number of $N_{rp}$ of master-to-slave slots is gradually increased until the total number $N_{rp}$ until a maximum is reached. In one embodiment, the maximum number $N_{rp}=15$. In another embodiment, the maximum number $N_{rp}=127$.

In one embodiment, the step of causing the slave unit to enter the second recovery state is performed immediately after the maximum time period $T_{FASTRECOVERY}$ has elapsed.

In one embodiment, the hopping sequence is a pseudo-random sequence.

In one embodiment, the pseudo-random sequence is determined by an address of the slave unit.

In one embodiment, both the first and the second recovery state are low duty cycle states.

In one embodiment, the frequency hopping communications system is a Bluetooth system in Bluetooth Sniff mode.

The different features of the above-mentioned embodiments can be combined in any combination.

Another aspect of the invention relates to a method for synchronization recovery in a radio communication system, e.g. a Bluetooth communication system.

Yet another aspect of the invention relates to an arrangement for synchronization recovery in a radio communication system, e.g. a Bluetooth communication system.

Still another aspect of the invention relates to a low-power recovery scheme that is capable of putting both master unit and slave unit in low-duty cycle modes and allowing re-synchronization once the units are in range again. For example, in WPAN applications a user would benefit from such substantially automatic recovery scheme where a link once lost due to e.g. range (or disturbance), is recovered as soon as the units come into range again (or the disturbance is removed).

A further aspect of the present invention relates to a recovery scheme, which has both a low-duty cycle page and a low-duty cycle page scan. This may e.g. be achieved by using the clock information that was present during the previous or last synchronization. As time elapses, this clock information may become less reliable (due to unknown clock drifts), forcing a higher duty cycle. Therefore, the recovery scheme may be divided into a fast and a slow recovery state, respectively. In the fast recovery state, the units may re-connect within about 1 second when they come in sufficient range again. A fast recovery may be achieved within e.g. 30 minutes from the previous synchronization. If the units have not been re-synchronized within the 30 minutes, they may enter the slow recovery state. In the slow recovery state, the re-connection time may take a little longer (e.g., up to 30 seconds). In the slow recovery state, the slave unit may also be susceptible to conventional Bluetooth paging messages.

Some embodiments of the present invention provide a method for units applying a FH communications system, which allows for a more automatic recovery of a previously lost connection between two units as compared to the known prior art. It is an advantage with some embodiments of the invention that when a connection or link has been previously lost, the recovery of said connection or link can be re-established once the units are within range again. At the same time, any excessive power consumption in the units may be limited while providing acceptable latencies. The recovery procedure according to some embodiments of the invention is attractive, e.g., if a short or medium-length interruption in a communication link or connection is experienced by two units applying a FH communications system. The low power auto-reconnect procedure according to some embodiments of the invention may extend up to hours of duration while maintaining sufficiently low power consumption of the involved units.

BRIEF DESCRIPTION OF THE DRAWINGS

Further objects, features and advantages of the invention will appear from the following detailed description of embodiments of the invention, wherein embodiments of the invention will be described in more detail with reference to the accompanying drawings, in which.

DESCRIPTION OF EMBODIMENTS OF THE INVENTION

Embodiments of the present invention will be described more fully hereinafter with reference to the accompanying drawings, in which some embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to persons skilled in the art.

Figure 1A:
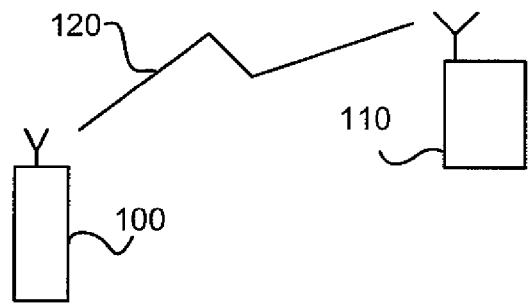
FIG. 1A illustrates a master unit and a slave unit communicatively connectable to each other in a frequency hopping communications system.

FIG. 1A shows a master unit 100 and a slave unit 110 in a frequency hopping (FH) communications system. The master unit 100 and the slave unit 110 may be communicatively connected to each other via a communication link or connection 120 in the FH system. In order to facilitate the understanding of the present invention, a Bluetooth sniff mode will be considered as the FH system in the following disclosure. The Bluetooth sniff mode is a low power mode, which is generally applied when little activity is expected on the link 120 while a low latency is desired for a fast response, e.g. response times in the order of one second. A main purpose of the Bluetooth sniff mode is generally to maintain the timing and frequency-hop synchronization between the units 100, 110. This may require periodic contact between the master unit 100 and the slave unit 110. The sleep interval may e.g. depend on i) the latency requirements, and ii) the mutual drift between the clock references in the master and slave units 100, 110. For latency reasons, the sleep interval may, preferably, be approximately 1.28 seconds. Therefore, the default interval of 1.28 seconds is assumed throughout this disclosure.

Figure 1B:
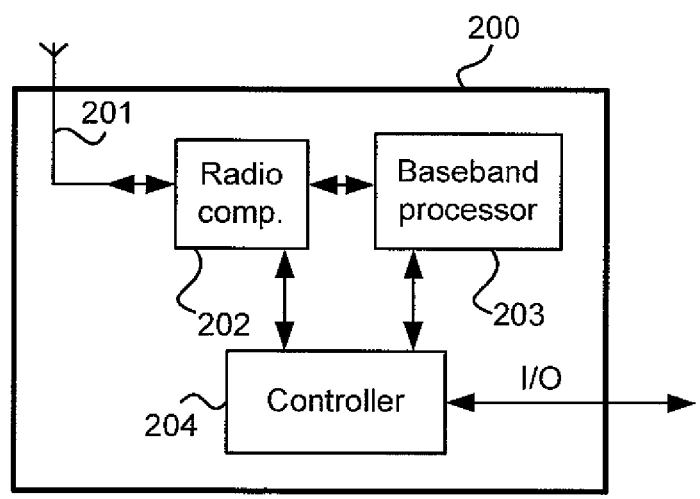
FIG. 1B is a block diagram of an embodiment of a transceiver unit, which may be implemented in the units shown in FIG. 1A.
Figure 1C:
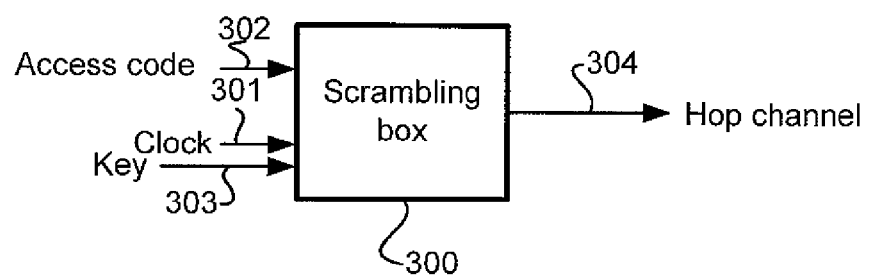
FIG. 1C is a block diagram of conventional means for performing hop selection.

An example of a frequency-hopping transceiver unit 200 is shown in FIG. 1 B. Master units 100 of the FH system may incorporate the frequency-hopping transceiver unit 200. Also, slave units 110 of the FH system may incorporate the frequency-hopping transceiver unit 200. The transceiver unit 200 comprises an antenna 201, a radio component 202, a baseband processor 203 and a controller 204. The baseband processor 203 may provide frames of information bits to the radio unit 202. The radio unit 202 may then modulate and up convert the modulated signal to the proper hop frequency, and transmit the signal via the antenna 201. The radio unit 202 may transmit TX frames in different hop frequencies according to a pseudo-random FH sequence. RX frames may be received either in between the TX frames, or alternatively, they may be received simultaneously with the transmission of the TX frame. To minimize interference between transceivers supporting different links, each link may apply a unique hop sequence. The cross correlation between different hop sequences should, preferably, be small in order to minimize collisions of frames of different links. Error correction protocols to overcome collisions should, preferably, also be implemented. In an exemplary FH system, each transceiver unit 200 has a unique access code and a free-running clock. The access code may be considered as the user address. The access code may select the FH sequence that will be used. The clock may determine the phase in the sequence, that is, which particular hop channel of the sequence is selected at a specific time. An embodiment of a conventional means for performing hop selection is illustratively shown in FIG. 1C. This figure shows a scrambling box 300 in which a hop channel is derivable from the clock 301, an access code 302, and (optionally)

a unique encryption key 303 in a pseudo-random way. Each time the clock 301 is updated, a new hop channel 304 may be selected according to a pseudo-random algorithm implemented in the scrambling box 300. Two units 100, 110 that are connected may use the same access code, the same clock and, if present, the same encryption key for the duration of the connection. Once connected, a mechanism may be applied to keep the two clocks synchronized. This may, for example, be achieved by synchronization bit-sequences in the frame headers that indicate an early or late reception, which can then be used to slow down or speed up the clock rate, respectively. If a leaky mechanism in the clock update is applied, the two units may be loosely connected at an intermediate clock rate.

Figure 2:
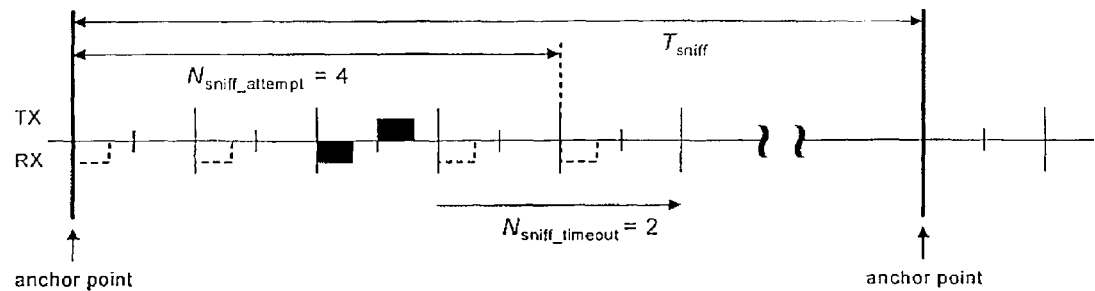
FIG. 2 illustrates a timing diagram of a Bluetooth sniff timing mode.

FIG. 2 illustrates a timing diagram of an exemplary Bluetooth sniff timing mode. A slave unit 110 in sniff mode may wake up periodically in order to listen to transmissions from the master unit 100 and in order to re-synchronize its clock offset. In the sniff mode, the duty cycle of the slave unit's 110 listening activity may be reduced. If a slave unit 110 participates on a certain link, it may have to listen in every slot to the master unit traffic. With the sniff mode, the time slots where the master unit 100 may start transmission to a specific slave unit 110 may be reduced; that is, the master unit 100 may start transmission in specified time slots. These so-called sniff slots are spaced regularly with an interval known as $T_{sniff}$, see FIG. 2. The slave unit 110 may begin to listen at the sniff slots for $N_{sniff\_attempt}$ consecutive receive slots unless a packet with a matching address is received. After every reception of a packet with a matching address, the slave unit 110 may continue listening at the subsequent $N_{sniff\_timeout}$ or remaining of the receive slots, whichever is greater. So, for $N_{sniff\_timeout} > 0$, the slave unit 110 may continue listening as long as it receives packets with a matching address. In order to enter the sniff mode, the master unit 100 or, alternatively, the slave unit 110 may issue a sniff command message. This sniff command message may contain the sniff interval $T_{sniff}$ and an offset $D_{sniff}$. The timing of the sniff mode is then determined. The illustrative timing diagram of a sniff mode shown in FIG. 2 uses a periodic scheme where anchor points are separated by the sniff interval $T_{sniff}$. The master unit 100 may send a packet in any of the $N_{sniff\_attempt}$ frames (in one exemplary embodiment, a frame may e.g. consist of a 625 µs master-to-slave slot followed by a 625 µs slave-to-master slot). The slave unit 110 may be required to listen on all $N_{sniff\_attempt}$ frames even if only the first frame is used. Once a packet sent from the master unit 100 has been received by the slave unit 110, the slave unit 110 may listen for at least $N_{sniff\_timeout}$ additional frames following the frame the last packet was received in. Since a slave unit 110 will normally listen for at least $N_{sniff\_attempt}$ frames, in addition to more flexibility in the transmitter, $N_{sniff\_attempt} > 1$ may generally provide extra robustness. If a packet reception fails, e.g. due to multipath fading, the master unit 100 may re-transmit at a different frequency but still in the same sniff interval $T_{sniff}$. During the sniff mode, the slave unit 110 may adjust its clock so that it may remain synchronized to the master unit 100. At the anchor points, the packet exchange may provide timing information to update the clock of the slave unit 110. However, also when no packets are exchanged, the clocks of the master unit 100 and slave unit 110, respectively, may remain loosely in sync due to the previous adjustments. The rate at which synchronization is lost may e.g. depend on the mutual drift between the clock references. Synchronization may be important for ad-hoc connections e.g. in a Bluetooth system. In the Bluetooth system, each unit 100, 110 has a free-running native clock which may have an accuracy of 20 ppm when the unit is active and up to e.g. 250 ppm when the unit is in a low-power power mode. When a unit 100 wants to page another unit 110, it may speed up the connection establishment when it knows the native clock of the receiving unit 110. This clock information should, therefore, preferably be stored during a previous connection stage. A unit may thus have a list of unit addresses with corresponding native clocks it may use when paging one of these units. The clock information may, e.g., be stored as a time offset to its own native clock. When a piconet is in operation, the native clock of the master unit 100 may determine the timing. The slave units 110 may add an offset to their own native clocks in order to be hop-synchronized to the master unit 100. The native clock of the slave unit 110 plus the offset with respect to the master unit 100 may provide the proper input to the hop selection scheme. Since the native clocks of the master unit and the slave unit(s) are free-running, the offset in the slave unit(s) 110 may have to be adjusted substantially continuously to compensate for drift. The reception of packets sent by the master unit 100 may be used to adjust the offset. Furthermore, the access code in front of the packet may have the proper autocorrelation properties to enable a slave unit 110 to derive the timing.

If a connection 120 between the master unit 100 and the slave unit 110 is lost during Bluetooth sniff mode the units 100, 110 would, in the known prior art, return to the well-known page and page scan modes to recover the connection 120. The master unit 110 would return to the page scan mode (with a duty cycle of about 0.9-1%) while the former master unit 100 would try one page lasting for about 10 seconds. If the connection 120 would not be recovered, the former master unit 100 would not page the slave unit 110 again. This recovery procedure may be costly with respect to power consumption. It would also not result in a successful recovery if the units were out of the coverage range for more than 10 seconds, i.e. the duration of the page. All in all, this means that the connection 120 would not be recovered automatically when the units come in range again, unless the interruption lasts less than said 10 seconds. Thus, in the known prior art, a user action would normally be required to re-connect the units again once they have lost their previous connection 120.

The present disclosure proposes a recovery procedure, which allows for a more automatic recovery of a previously lost connection 120 between two units 100, 110 in a FH system, e.g. Bluetooth sniff mode, as compared to the known prior art. When a previous connection 120 between two units 100, 110 has been lost (e.g. due the fact that the two units 110, 110 have moved out of the coverage range of each other) a recovery of said connection 120 may be established and at the same time any excessive power consumption in the two units 100, 110 may be limited while acceptable latencies may be provided. Some embodiments of the present invention provide a substantially automatic recovery procedure for recovering a previously lost connection 120 between two units 100, 110 in a FH system, such as Bluetooth sniff mode. A recovery procedure is presented herein, which may have both a low-duty cycle page and a low-duty cycle page scan. This may be achieved by using clock information that was present during the last connection 120 between the two units 100, 110. The clock information may be available from free-running clocks in the respective units 100, 110. As time elapses, this clock information may be less reliable, e.g. due to clock drifts, which in turn requires a higher duty cycle. To this end, a recovery procedure having different recovery states is proposed herein. The recovery procedure may, preferably, be divided into a first recovery state (referred to as the fast recovery state in the following disclosure) and a second recovery state (referred to as the slow recovery state in the following disclosure). In the fast recovery state, the units 100, 110 may reconnect to each other within e.g. one second once the units come into the coverage range of each other again. If the units have not been reconnected (and, hence, re-synchronized) within a maximum time period $T_{FASTRECOVERY}$ of e.g. 30 minutes, the units may enter the slow recovery state. In the low recovery state, the reconnection may take more time as compared to the fast recovery state, e.g. up to 30 seconds. It should be noted that the accuracy of the clock estimate may depend on the relative drift of the clocks in the two units 100, 110 as well as on the time elapsed since the two units exchanged their respective internal clock values during a connection. The larger the drift and the longer the time, the larger is the uncertainty in time and frequency and, hence, the longer the paging process may take. In the proposed system, the clocks are free-running. Clock offsets may be utilized in the estimation process. In this way, a unit may have a list of clock offsets with respect to one or several other units that it has been connected with in the past.

In the following, two exemplary embodiments of the inventive recovery procedure will be presented; more details can be found in the following. The building blocks used in the fast and slow recovery procedures may be based on the conventional paging scheme used in Bluetooth. For example, Only ID packets may be used to exploit their robustness; the Device Access Code (DAC) of the slave unit 110 may preferably be used. Indeed, an ID packet comprises an direct-sequence (DS) code. This code may be related to the identity of the device in question (Device Access Code, DAC). Since it is a DS code, it may provide processing gain like in a direct-sequence spread spectrum system. In the receiving unit, the received ID packet is compared (correlated) with an exact replica of the code. If sufficient bits match, a reception may be announced. Depending on the threshold that is set in the system, it may be possible to accept the packet already when 80% or 90% of the bits match. This may provide the extra robustness to the system. Furthermore, the page hopping sequence belonging to the slave unit 110 may be used. These choices enable the master unit 100 to reach the slave unit 110 even using a conventional paging procedure. During recovery, the slave unit 110 will only scan periodically on a single hop frequency according to the page hopping sequence, similar to a conventional page scan. The recovery scan window may, however, be considerably shorter than the conventional page scan. For the slave unit 110, the difference between fast and slow recovery is only in the interval between scans, which may be somewhat longer in slow recovery than in fast recovery. The master unit 100 may transmit ID packets on different frequencies, but compared to conventional paging, the duty cycle may be much smaller.

Figure 3:
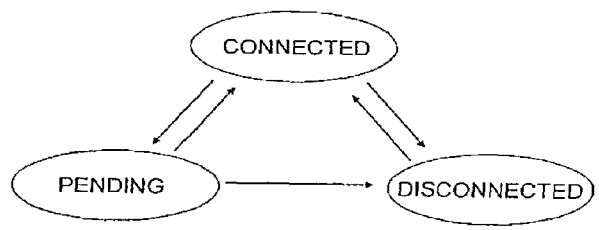
FIG. 3 illustrates a three-state model of a recovery procedure according to an embodiment of the invention at an application level.

FIG. 3 illustrates a three-state model of the recovery procedure at an application level. From an application point of view as shown in this figure, the link or connection 120 is either present (connected) or not (disconnected) between the master unit 100 and the slave unit 110. However, from a user perspective, a third state may be desirable: namely, "pending". The pending state indicates that the link has existed in the past, but is currently not present because the units are out of range. In order to become connected again, the user has to do no other action than just moving the units closer together. The link may then be re-established substantially automatically by means of a recovery procedure as disclosed herein. As a mere example, a headset application may be considered. In the connected state, the phone (master unit 100) display may e.g. show a headset icon, showing the user that all incoming and out-going calls will be directed to the headset (slave unit 110). In the disconnected state, no icon is present and the headset may not be used. In the pending state, the icon may be dashed or, alternatively, may contain a question mark. This may indicate to the user that he/she merely needs to move the headset closer to the phone in order to return to the connected state. The unit may move from connected state to pending state when a loss of link 120 is experienced (a timeout on the number of missed packets in a row). When the link 120 is recovered, the units 100, 110 may automatically move back from pending state to connected state. However, if the pending state lasts too long without any recovery, the unit may automatically move to the disconnected state. This would typically happen if the units have been in pending state for a couple of hours.

Figure 4:
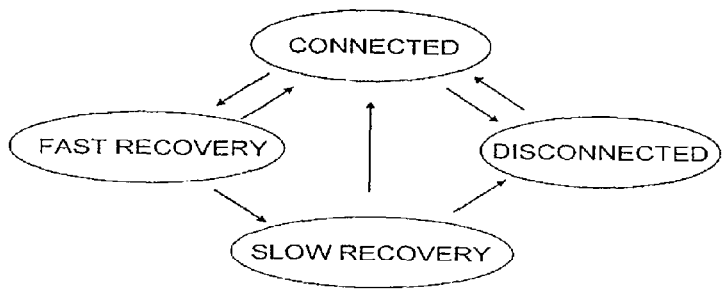
FIG. 4 illustrates a four-state model of a recovery procedure according to an embodiment of the invention at an PHY/MAC level.

FIG. 4 illustrates a four-state model of the recovery procedure at a PHY/MAC level. At PHY/MAC level, the recovery of link 120 may take place during the pending state. In order to maximally exploit the pre-knowledge of frequency and time, the recovery procedure in accordance with embodiments of the invention may be adapted to take into account the time elapsed since the last synchronization. The recovery scheme may dissipate more power as time passes since the uncertainty in time and frequency increases. As can be seen in FIG. 4, the recovery procedure is split into the first recovery state ("fast recovery") and the second recovery state ("slow recovery"), see FIG. 4. When the link 120 has been lost in e.g. the last 30 minutes, the user may expect a fast recovery when the units come into range again. If the link 120 has been lost for a longer time, a longer delay may be acceptable. If the link has been lost for a very long time (e.g. several hours), a user-initiated action may, however, be required to return to the connected state. These differences in latency may be exploited to optimize the overall power consumption.

In the following, two exemplary embodiments of the inventive recovery procedure will be presented in greater detail. It goes without saying that the various features described with reference to the two embodiments may also be combined in the same embodiment.

First Embodiment

During fast recovery, the time elapsed since the previous or last synchronization between master unit 100 and slave unit 110 is still sufficiently small (a couple of minutes up to e.g. maximum 30 minutes) to be able to predict the timing in the both units 100, 110 (see FIG. 1). The former slave unit 110 (e.g. a headset or a watch) enters a recovery scan state; the former master unit 100 (e.g. a mobile phone) enters a recovery page state. Important to mention is that both these states may be low duty cycle states (in contrast to the conventional page state in Bluetooth).

Fast Recovery Scan

Figure 5:
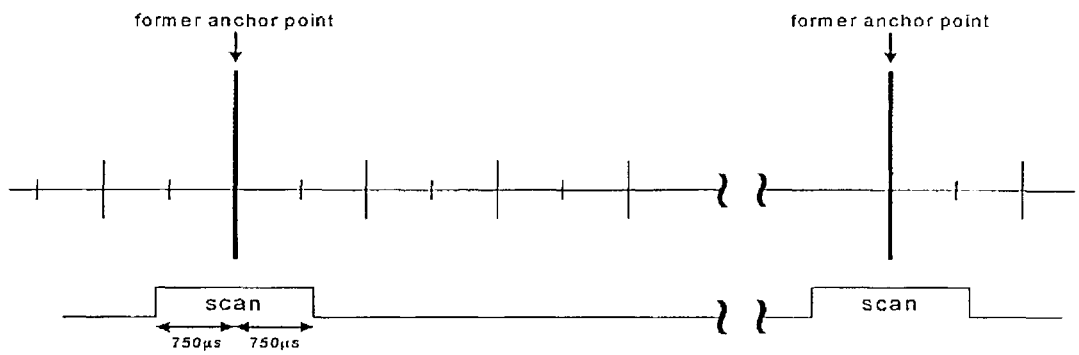
FIG. 5 illustrates a timing diagram of a fast recovery scan window according to an embodiment of the invention.

When a loss of link 120 (see FIG. 1) has been detected, the former slave unit 110 enters the fast recovery scan state. The initial timing of the scan window may be based on the anchor point timing experienced during sniff. That is, the center of the scan window may be placed at the former anchor point, see FIG. 5 which illustrates a timing diagram of the fast recovery scan window. The scan window may have a length of about 1.5 ms. The scan repetition period may be 1.28 s. This results in a duty cycle of about 0.1% which is larger than the duty cycle in Bluetooth sniff mode, albeit sufficiently low. The hop frequency used may be selected from the 32-carrier page hopping sequence corresponding to the BD-ADDR of the slave unit 110. For each scan, a new hop carrier may be selected. The clock value k that is applied may be based on the former master clock as used when in sniff mode (alternatively, the slave native clock can be used, but then this slave clock or clock offset should have been communicated to the master while in sniff. For the moment, it may be assumed that the slave clock is unknown to the master)

During scan, the slave unit 110 may correlate the incoming signals against a known 68-bit access code related to the BD-ADDR of the slave unit 110. This may be an ID packet corresponding to the Device Access Code (DAC) also used in conventional page scan. When the correlator output exceeds a threshold, the slave unit 110 may be configured to enter a recovery response sub-state which may be identical to the Bluetooth page response sub-state. The slave unit 110 may be configured to return an identical ID packet at the proper timing and await the reception of a FHS packet. The FHS packet may then re-synchronize the timing and frequency hopping of the slave unit 110. The slave unit 110 may remain in recovery scan until the link 120 is re-established or when a timeout $T_{FASTRECOVERY}$ has exceeded indicating the end of the fast recovery state. Assuming a worst case mutual drift of e.g. 40 ppm, the timeout $T_{FASTRECOVERY}$ may, preferably, be set to about 30 minutes. It should be appreciated that the fast recovery scan is similar to the conventional Bluetooth page scan. A difference is, however, in the clock used for determining the hop frequencies and wake up timing. In the prior art scheme, it is the native clock of the slave unit 110 that sets the timing; in the fast recovery procedure disclosed here, it is the slave unit's estimate of the master clock that sets the timing.

Fast Recovery Page

When a loss of link 120 has been detected, the former master unit 100 enters the fast recovery page state. The initial timing of the fast recovery page may be based on the anchor point timing experienced during sniff mode. If an ID packet is sent at the anchor point, the slave unit 110 will receive this (provided the units 100, 110 are within range). The ID packet comprises the DAC of the slave unit 110 which is to be reconnected to the master unit 100. The frequency may be selected from the slave unit's page hopping sequence f(k), where k is the current clock of the master.

However, due to drift, the timing of ID transmissions, i.e. transmissions of an at least one ID packet, sent by the master unit 100 and that of the scan window in the slave unit 110 will drift; after 750 μs/2γ (ignoring the second ID transmission) there will not be an overlap anymore. For γ=20 ppm, this may happen already after 18 seconds. Therefore, in the recovery page state, the transmission window may need to be increased both before and after the anchor point, see FIG. 6.

Figure 6:
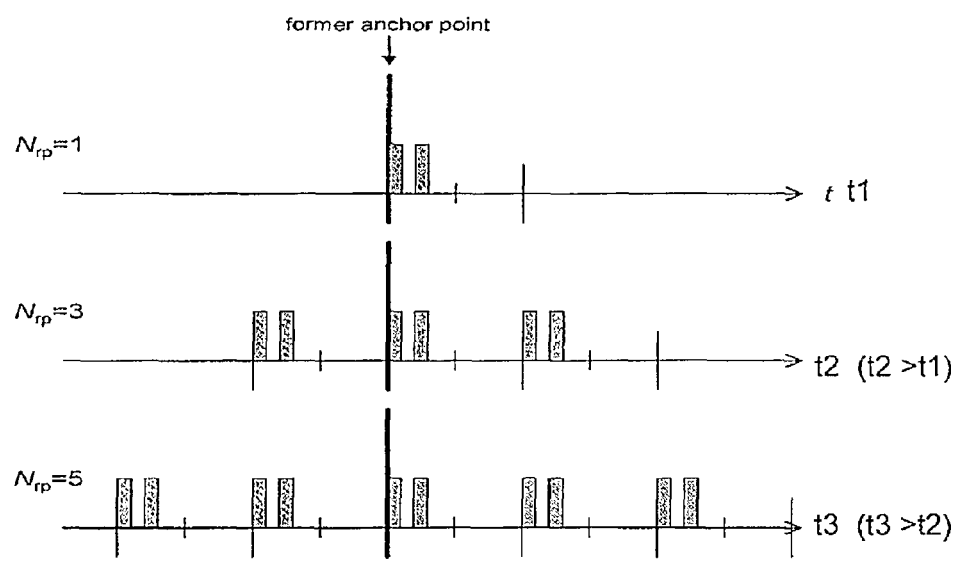
FIG. 6 illustrates how a number of ID packets can be gradually increased over time according to an embodiment of the invention.

The increase may be done gradually as time progresses as is illustratively shown in FIG. 6. It should be noted that FIG. 6 (as well as FIGS. 11, 12, and 18) only shows the transmissions (slots), not the receive slots. The person skilled in the art, however, readily appreciates that to each master-to-slave frequency and time slot, there is a corresponding slave-to-master frequency and time slot. This is however not shown in FIG. 6 (and FIGS. 11, 12, and 18). FIG. 6 illustrates an example of how the number $N_{rp}$ of master-to-slave slots, each comprising two ID packets, may be increased as time progresses. In this illustrative example, two ID packets (instead of only one) are used in order to be aligned with the conventional Bluetooth page procedure where two ID packets per master-to-slave slot are generally used. However, in the conventional Bluetooth page, the ID packets are sent on different frequencies whereas in the herein suggested fast recovery page procedure, the ID packets are sent on the same frequency.

Figure 7:
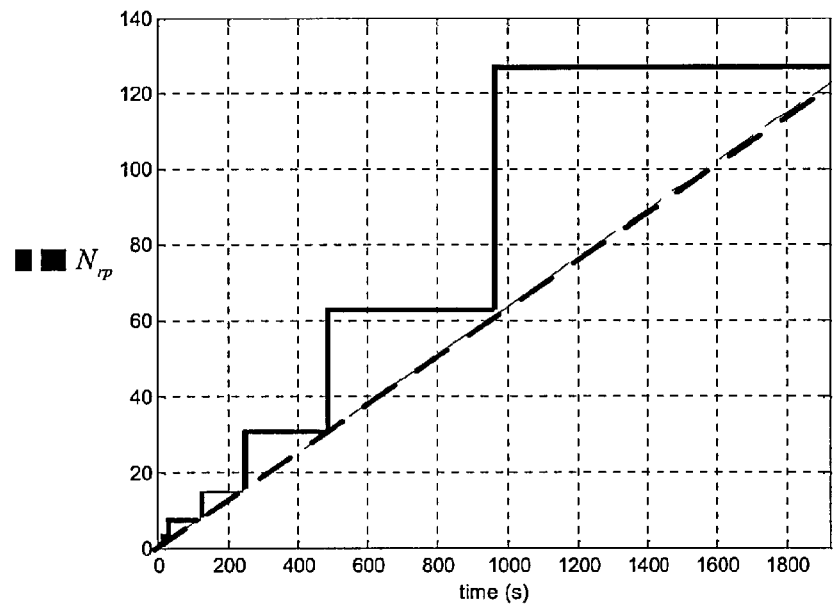
FIG. 7 illustrates an increase in the number $N_{rp}$ of master-to-slave slots as time progresses.
Figure 8:
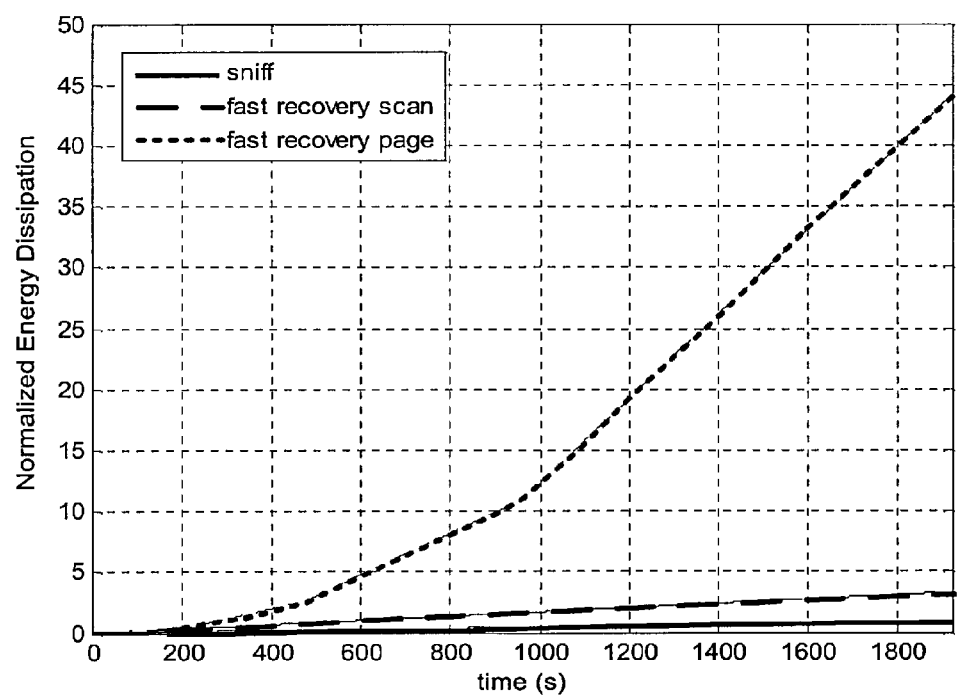
FIG. 8 illustrates an exemplary energy dissipation when time progresses for sniff, fast recovery scan, and fast recovery page (normalization towards sniff over 30 minutes) according to an embodiment.

FIG. 7 illustrates a possible increase of $N_{rp}$ over time. To simplify the implementation, seven discrete steps may be taken where the number of recovery page master-to-slave slots may be increased from 1 to 127. The solid line shows possible and suggested incremental steps (γ=20 ppm assumed). As time progresses, the duty cycle of the recovery process in the former master unit 100 may increase from 0.04% for $N_{rp}$=1 to about 5% for $N_{rp\_max}$=127. In FIG. 8, the energy accumulated over time is shown for the different modes. The optimized sniff mode is taken as a reference ($E_{sniff}$=1 at t=30 minutes). The energy dissipation of fast recovery scan is close to that of sniff; the fast recovery page energy dissipation may increase faster due to the increase in duty cycle.

Latency in Fast Recovery

The latency in the fast recovery procedure may preferably, but not necessarily, be determined only by the scan interval. When the units are in range and no errors occur, the maximum response time may be 1.28 s. If a uniform distribution of the scan timing once the units come into range is assumed, the average latency may be 640 ms.

Compatibility with Bluetooth Page

It may be the case that after link loss but before the slow recovery begins, one of the units 100, 110 is reset and enters the disconnected mode. For example, the master unit 100 may be reset while the slave unit 110 is still in slow recovery state. The master unit 100 would then not be able to link to the slave 110. This may be solved in two different ways. In a first variant, a special page can be constructed which is similar to the original, standardized, Bluetooth paging method with A and B trains. A difference is in the repetition time of the A and B trains. In the standardized method, the use of A and B trains is alternated every 1.28 s. The slave unit 110 in recovery scan will miss its frequency always when it is misaligned and its scanning frequency is not in the batch with overlapping frequencies (this is because the scan window is smaller than 10 ms, the time needed to cover all 16 frequencies of a conventional page train). However, since the slave unit 110 in recovery scan has exactly the same periodicity of 1.28 s, it will continuously miss the proper frequency. To compensate for this, the special page from the master unit 100 (during the fast recovery mode when it cannot do a page recovery as discussed above) is configured to have a slightly different periodicity such that the slave unit 110 scanning is going to time slide through the A and B trains of the standard Bluetooth page. Accordingly, the period of alternation between A and B trains may change from 1.28 s to 1.28±dt where dt is dependent on the scan window length used by the slave in recovery scan. This scheme will also work even if the slave unit 110 had left the slave recovery mode and entered the standby state. A second variant involves using a 11.25 ms scan window for the slave recovery process. This may be identical to the original Bluetooth page. The slave unit can then be accessed both via the standard Bluetooth page and via the new recovery page. This may have some impact on the way the page recovery scheme will select the position of additional $N_{rp}$ retransmissions and the time schedule when new retransmissions are added. Also the duty cycle of the slave unit in recovery mode will increase (from 0.1% to about 0.9%) whereas the duty cycle of the master recovery scheme can be reduced (it will probably never have to reach to 5% but may end at about 1.5%). The latter scheme is also described in more detail in the second embodiment hereinbelow.

Slow Recovery

It is possible to continue increasing the number $N_{rp}$ of recovery page slots as time progresses even beyond $T_{FASTRECOVERY}$. $T_{FASTRECOVERY}$ may be set to e.g. 30 minutes. However, the duty cycle of the master unit will then potentially increase above 5% and may, hence, drain the battery for higher duty cycles. Therefore, when the fast recovery states have lasted for about $T_{FASTRECOVERY}$=30 minutes, the units 100, 110 may be adapted to enter a slow recovery state. In this state, the number of recovery slots $N_{rp}$ is frozen to 127 in this example; the master duty cycle therefore remains at a level of approximately below 5%. Since the time drifting still may take effect, the recovery scan state is adapted; not by increasing the scan window length, but by changing the scan repetition period such that a time sliding effect is enforced (but much faster than is caused by the drift from the clocks).

Slow Recovery Scan

Figure 9:
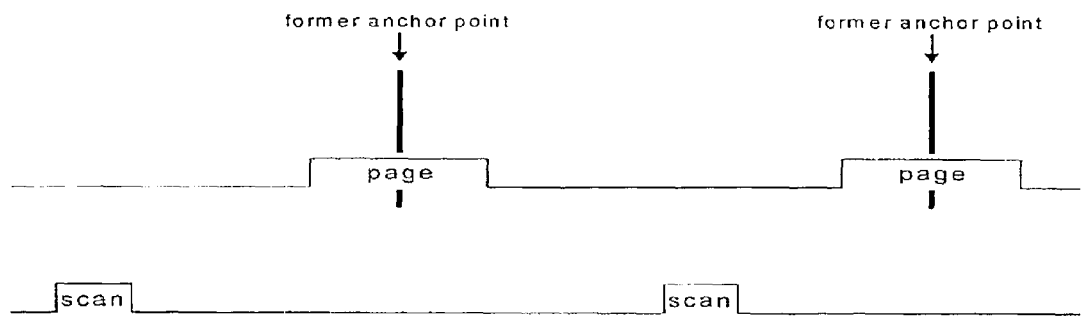
FIG. 9 illustrates timing misalignment between scan and page according to an embodiment of the invention.

When the units 100, 110 enter the slow recovery state, they both have a low duty cycle (about 5% for the recovery page and about 0.1% for the recovery scan). In a worst case situation, the recovery paging may occur just in between two scans as is shown in FIG. 9.

If the scan repetition period is increased from 1280 ms to 1280 ms+$\Delta T$, the scanning instances may start to slide with respect to the former anchor points. The maximum $\Delta T$ may be determined by the page window or:

$$\Delta T \leq N_{rp\_max} * 1.25 \text{ ms} = 127 * 1.25 \text{ ms} = 158.75 \text{ ms}$$

When in range and error-free conditions, the scanning window may overlap with the page window in maximally eight intervals or about 10 s. On average, it would then take 5 s before overlap occurs. If a smaller step $\Delta T$ is chosen, it may take longer before an overlap occurs. However, once an overlap occurs, there may be several overlap occasions in a row which increases the robustness.

Figure 10:
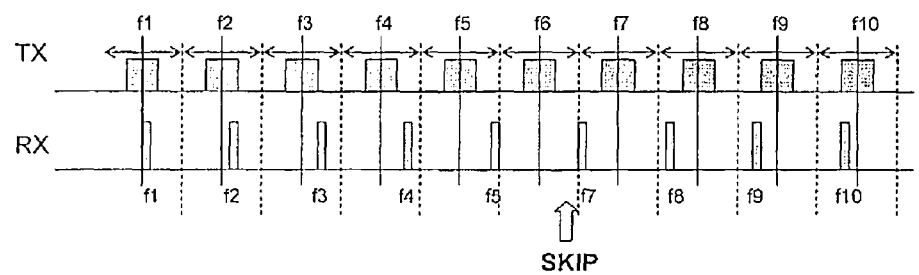
FIG. 10 illustrates that a scanning frequency may be skipped from the page hopping sequence according to an embodiment of the invention.

It may be important that for the selection of the scan frequency, the scanning device adheres to the former anchor points of the previous connection based on the master clock information. For the scanning frequency selection, an update may be made every 1280 ms e.g. right in between the two anchor points. This is shown in FIG. 10. Since the scan timing may slide through this frequency selection timing, periodically a frequency may be skipped from the page hopping sequence. In other words, in slow recover scan, the time sliding effect between the master unit 100 and the slave unit 110 may be increased by increasing the time interval between scans. This may introduce a forced drift of e.g. 12%. It may be generally important that this enforced drift is not applied on the frequency hop selection in the page hopping sequence. Otherwise, it may be possible to loose FH sync very quickly. The selection of hops shall, preferably, be based on the former clock information of the link (and show only a drift of 40 ppm at maximum).

Slow Recovery Page

So far, it has been assumed that the paging in the slow recovery page state is identical to that in the last stage of the fast recovery page state. At instance k, two ID packets where sent at a fixed carrier frequency f(k) with a maximum repetition number of $N_{rp\_max}=127$. If it is desired to slow recovery to last beyond 4.5 hours (or for $\gamma$ values other than 20 ppm), FH synchronization may become an issue. This may be solved by increasing the number of carrier frequencies to three: f(k−1), f(k), and f(k+1). With the slow recovery covering the three frequencies, FH synchronization can be guaranteed up to 13 hours (assuming a worst-case drift of 40 ppm).

Figure 11:
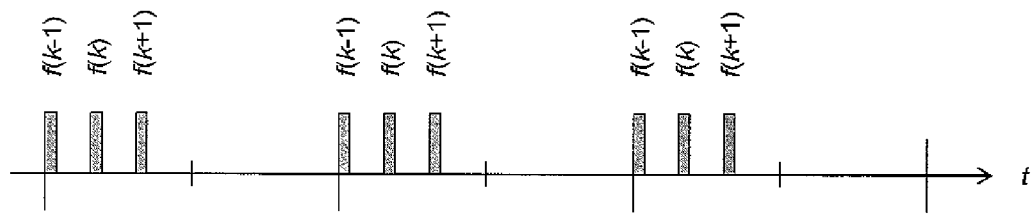
FIG. 11 illustrates three ID packets in one master-to-slave slot.
Figure 12:
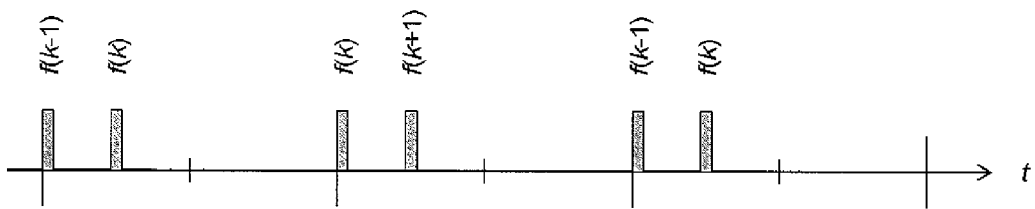
FIG. 12 illustrates two ID packets per master-to-slave slot, where three frequencies are distributed over two master-to-slave slots.

Sending on three frequencies can be done in two different ways, see FIG. 11 and FIG. 12, respectively. In FIG. 11, the timing is different from the Bluetooth page timing. Instead of two ID packets, three ID packets are sent. Since the ID packet length is 68 μs, there is 625/3−68 μs≈140 μs to switch the synthesizer. This is sufficient for modern fractional-N synthesizers (which need about 50 μs to switch frequencies). The duty cycle of the slow recovery page would, however, increase by 50%. The scheme depicted in FIG. 12 follows the Bluetooth timing more closely. However, the three frequencies cannot be caught in a single 1.5 ms scan window. The time sliding effect as discussed in the previous section is therefore important. It may now be required that if there is overlap at one instance, at the next instance there should also be overlap but now with two other frequencies. In the previous section, it has been shown that the increase $\Delta T$ in the scan repetition period should be at most $\Delta T_{max}=N_{rp\_max}*.1.25$ ms. It may now be required that the incremental increase $\Delta T$ is not a multiple of 2.5 ms:

$$\Delta T = n \times 2.5 \text{ ms} + 1.25 \text{ ms}$$

But since two overlaps in a row may be needed, there should be $\Delta T < \Delta T_{max}/2$.

Latency in Slow Recovery

Figures 13, 14:
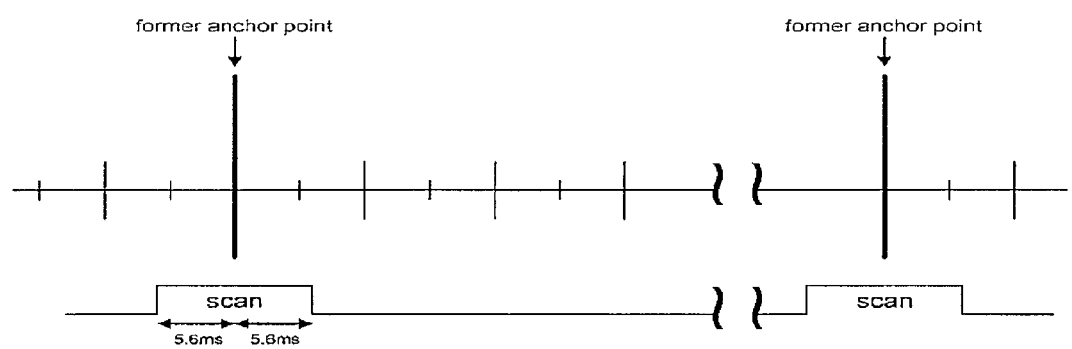
FIG. 13 is a table with latency values for different states.
FIG. 14 illustrates a timing diagram of a fast recovery scan window according to another embodiment of the invention.

Using a scan repetition period which is compatible with both the slow recovery page schemes (shown in FIG. 11 and FIG. 12) and with the normal Bluetooth page, the latency can now be determined for the different cases. For the 3-ID packet scheme of FIG. 11, the maximum latency may be about 56 s. It may be necessary with 42 steps to slide through the sleep period of 1.28 s−$N_{rp\_max}*1.25$ ms between two slow recovery page instances. Thereafter, it may be necessary with up to two steps to slide through the 1.25 ms window containing the three frequencies. This leads to 44*1.28 s≈56 s. For the two times 2-ID packet scheme of FIG. 12, it may again be necessary with 42 steps to slide through the sleep period. Thereafter, it may be necessary with up to four steps to slide through the 2.5 ms window containing the three frequencies. This leads to 46*1.28 s≈59 s. Finally, for the normal Bluetooth page, it may be necessary with 10 ms/1.25 ms=8 steps to slide through a 10 ms window. Since the steps for the same page train may be separated by 2.56 s, it may take maximally 8*2.56s=21 s before there is an overlap. The table of FIG. 13 summarizes the maximum and average response times once the units are within range and no errors occur.

Compatibility with Bluetooth

Preferably, but not necessarily, the slave unit 110 in slow recovery scan state is also susceptible to normal Bluetooth paging. This can be accomplished by choosing a proper scan repetition interval. Normal Bluetooth paging applies page trains A and B. A single page train may comprise ID packets sent at 16 different frequencies during a 10 ms window. This page train A may be repeated for 1.28 s after which a different page train B may be used for 1.28 s, etc. The 1.5 ms recovery scan window may be configured to slide properly through the trains. The separation between two scans on the same page train may now be nominally 2.56 s (page trains alternate with a 1.28 s period). Therefore, the scan repetition period should be:

$$\Delta T = m \times 10 \text{ ms} + 0.625 \text{ ms}$$

In the previous section, it was required that two consecutive scans would slide over a time length of 2.5 ms in total. The same coverage is also be obtained by four consecutive scans with a time stagger of:

$$\Delta T = n \times 2.5 \text{ ms} + 0.625 \text{ ms}$$

Because of the reduced duty cycle in the slow recovery page state (as opposed to the 100% duty cycle during a Bluetooth page), in order to get overlaps in four consecutive instances, it may be needed that $\Delta T < \Delta T_{max}/4$.

The preferred slow recovery scan repetition period $T_{scan}$ may be obtained with n=12, which leads to m=3. The scan repetition period may then become:

$$T_{scan} = 1280 + 30 + 0.625 \text{ ms} = 1310.625 \text{ ms}$$

An alternative would be to use the original Bluetooth scan procedure. In that case, the slave unit could both be accessed by the standard Bluetooth paging, and by the new slow recovery page (which is the fast recovery page at maximum $N_{rp}$). For further details, the reader is referred to the second embodiment described hereinbelow.

Second Embodiment

During fast recovery, the time elapsed since the previous or last synchronization is still sufficiently small (a couple of minutes up to e.g. maximum 30 minutes) to be able to predict the timing in the both units 100, 110 (see FIG. 1). The former slave unit 110 (e.g. a headset or a watch) enters a recovery scan state; the former master unit 100 (e.g. a mobile phone) enters a recovery page state. Important to mention is that both these states are low duty cycle states (in contrast to the conventional page state in Bluetooth).

Fast Recovery Scan

When a loss of link 120 (see FIG. 1) has been detected, the former slave unit 110 enters the fast recovery scan state. The initial timing of the scan window may be based on the anchor point timing experienced during sniff. That is, the center of the scan window may be placed at the former anchor point, see FIG. 14 which illustrates a timing diagram of the fast recovery scan window. The scan window may have a length of about 11.25 ms, i.e. identical to the scan window in a conventional Bluetooth page scan. The scan repetition period may be 1.28 s. This results in a duty cycle of 0.9% which is larger than the duty cycle in Bluetooth sniff mode, albeit sufficiently low. The hop frequency used may be selected from the 32-carrier page hopping sequence corresponding to the BD-ADDR of the slave unit 110. For each scan, a new hop carrier may be selected. The clock value k that is applied may be based on the former master clock as used when in sniff mode.

During scan, the slave unit 110 may correlate the incoming signals against a known 68-bit access code related to the BD-ADDR of the slave unit 110. This is an ID packet corresponding to the Device Access Code (DAC) also used in conventional page scan. When the correlator output exceeds a threshold, the slave unit 110 may be configured to enter a recovery response sub-state which may be identical to the Bluetooth page response sub-state. The slave unit 110 may be configured to return an identical ID packet at the proper timing and await the reception of a FHS packet. The FHS packet may then re-synchronize the timing and frequency hopping of the slave unit 110. The slave unit 110 may remain in recovery scan until the link 120 is re-established or when a timeout $T_{FASTRECOVERY}$ has exceeded indicating the end of the fast recovery state. Assuming a worst case mutual drift of 40 ppm, the timeout $T_{FASTRECOVERY}$ may, preferably, be set to about 30 minutes. It should be appreciated that the fast recovery scan is similar to the conventional Bluetooth page scan. A difference is, however, in the clock used for determining the hop frequencies and wake up timing. In the conventional scheme, it is the native clock of the slave unit 110 that sets the timing; in the fast recovery procedure disclosed herein, it is the slave unit's estimate of the master clock that sets the timing.

Fast Recovery Page

When a loss of link 120 has been detected, the former master unit 100 enters the fast recovery page state. The initial timing of the fast recovery page may be based on the anchor point timing experienced during sniff mode. If an ID packet is sent at the anchor point, the slave unit 110 will receive this (provided the units 100, 110 are within range). The ID packet comprises the DAC of the slave unit 110 which is to be reconnected to the master unit 100. The frequency may be selected from the slave unit's page hopping sequence f(k), where k is the current clock of the master.

Figure 15:
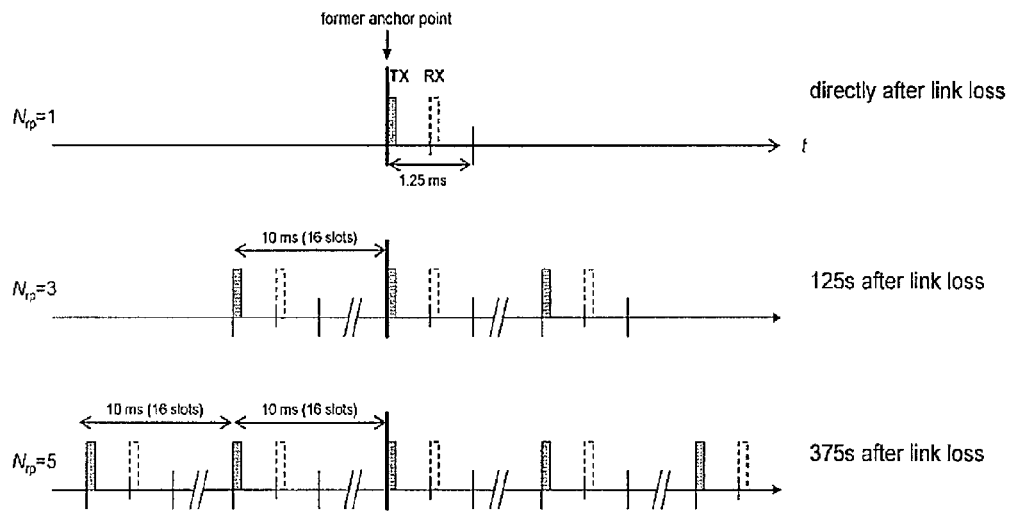
FIG. 15 illustrates how a number of ID packets can be gradually increased over time according to the embodiment of the invention shown in FIG. 14.

However, due to drift, the timing of ID transmissions, i.e. transmissions of at least one ID packet, sent by the master unit 100 and that of the scan window in the slave unit 110 will drift; after 5.6 ms/2γ there will not be an overlap anymore. For γ=20 ppm, this may happen after e.g. 140 seconds. Therefore, in the recovery page state, the transmission window may need to be increased both before and after the anchor point, see FIG. 15. Since the scan window spans 11.25 ms in this embodiment, the separation between consecutive ID packets may need to be smaller than 11.25 ms. In order to adhere to the Bluetooth slot timing, a 10 ms separation may advantageously be used. The increase may be done gradually as time progresses as is illustratively shown in FIG. 15. FIG. 15 shows an example how the number $N_{rp}$ of master-to-slave slots, each comprising a one ID packet, may be increased as time progresses. Note that FIG. 15 (in contrast to FIGS. 6, 11, 12, and 18) shows not only the transmissions (slots), but also the receive slots. In FIG. 15, the dashed lines represent the corresponding RX slots to receive a response from the scanning device, i.e. master unit 100.

Figure 16:
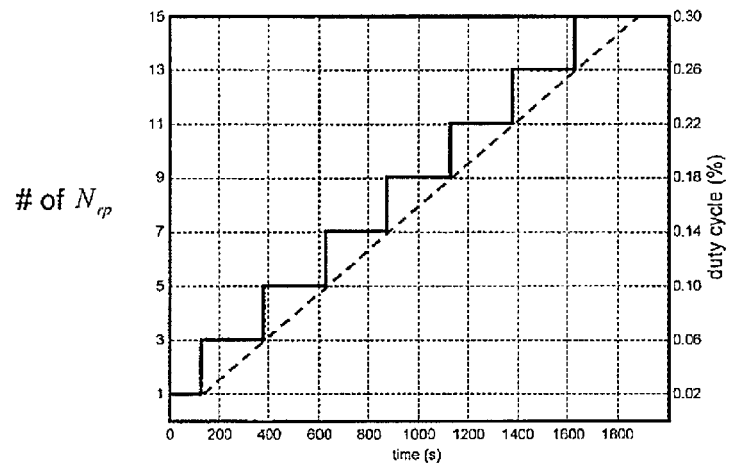
FIG. 16 illustrates an increase in the number $N_{rp}$ of master-to-slave slots as time progresses.

FIG. 16 illustrates a possible increase of $N_{rp}$ over time. The solid line shows suggested incremental steps (γ=20 ppm assumed). As time progresses, the duty cycle of the recovery process in the former master unit 100 may increase from 0.02% for $N_{rp}=1$ to about 0.3% for $N_{rp\_max}=15$ if it is assumed that the duty cycle is based on 50 μs synthesizer settling, 68 μs ID TX, 50 μs synthesizer settling, 68 μs ID RX.

Compatibility Between Fast Recovery Scan and Bluetooth Page

Since the fast recovery scan state uses substantially the same parameters as the conventional Bluetooth page scan, a slave unit 110 in fast recovery scan could always be connected via the conventional Bluetooth page procedure.

Latency in Fast Recovery

It should be appreciated that the latency in the fast recovery procedure is only determined by the scan interval. When the units 100, 110 are in range and no errors occur, the maximum response time is 1.28 s. The average latency will be 640 ms, if a uniform distribution of the scan timing once the units come into range is assumed.

Slow Recovery

It is possible to continue increasing the number $N_{rp}$ of recovery page slots as time progresses even beyond $N_{rp\_max}=15$. However, the duty cycle of the master unit will then potentially increase above 0.3% and may, hence, drain the battery for higher duty cycles. Therefore, when the fast recovery states have lasted for about $T_{FASTRECOVERY}=30$ minutes, the units 100, 110 are adapted to enter a slow recovery state. In this state, the number of recovery slots $N_{rp}$ is frozen to 15 in this example; the master duty cycle therefore remains at a level of approximately below 0.3%. Since the time drifting still may take effect, the recovery scan state is adapted; not by increasing the scan window length, but by changing the scan repetition period such that a time sliding effect is enforced (but much faster than is caused by the drift from the clocks).

Slow Recovery Scan

Figure 17:
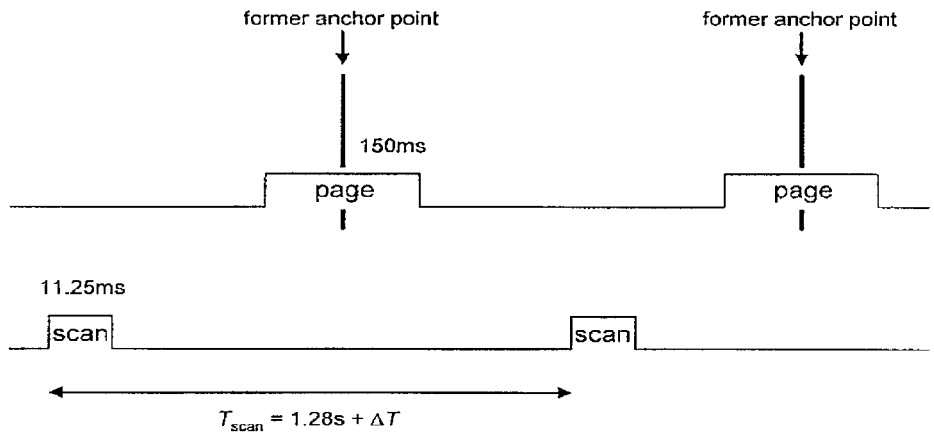
FIG. 17 illustrates timing misalignment between scan and page according to this embodiment of the invention.

When the units 100, 110 enter the slow recovery state, they both have a low duty cycle (about 0.3% for the recovery page and 0.9% for the recovery scan). In a worst case situation, the recovery paging may occur just in between two scans as is shown in FIG. 17.

If the scan repetition period is increased from 1280 ms to 1280 ms+ΔT, the scanning instances may start to slide with respect to the former anchor points. The maximum ΔT may be determined by the page window or:

$$\Delta T \leq N_{rp\_max} \cdot 10 \text{ ms} = 15 \cdot 10 \text{ ms} = 150 \text{ ms}$$

It should be noted that this sliding corresponds to a mutual drift of about 17% which is much larger than the mutual clock drift of several tens of ppm. Whether this clock drift is positive or negative may therefore be immaterial.

It should be noted that the selection of the scanning frequencies may still be based on the former anchor points and may be updated every 1280 ms (which is, however, not necessarily identical to every new scan event). Because of the time sliding of the scanning window with respect to the former anchor points, once in a while a scanning frequency in page hopping sequence may be skipped.

When in range and error-free conditions, the scanning window may overlap with the page window in maximally eight intervals or about 10 s. On average, it would then take 5 s before overlap occurs. If a smaller step ΔT is chosen, it may take longer before an overlap occurs. However, once an overlap occurs, there may be several overlap occasions in a row which increases the robustness.

Slow Recovery Page

So far, it has been assumed that the paging in the slow recovery page state is identical to that in the last stage of the fast recovery page state. At instance k, at least one ID packet is sent at a fixed carrier frequency f(k) with a maximum repetition number of $N_{rp\_max}=15$. If it is desired to slow recovery to last beyond 4.5 hours (or for γ values other than 20 ppm), FH synchronization may become an issue. This may be solved by increasing the number of carrier frequencies to three: f(k−1), f(k), and f(k+1). With the slow recovery covering the three frequencies, FH synchronization can be guaranteed up to 13 hours (assuming a worst-case drift of ±40 ppm).

Figure 18:
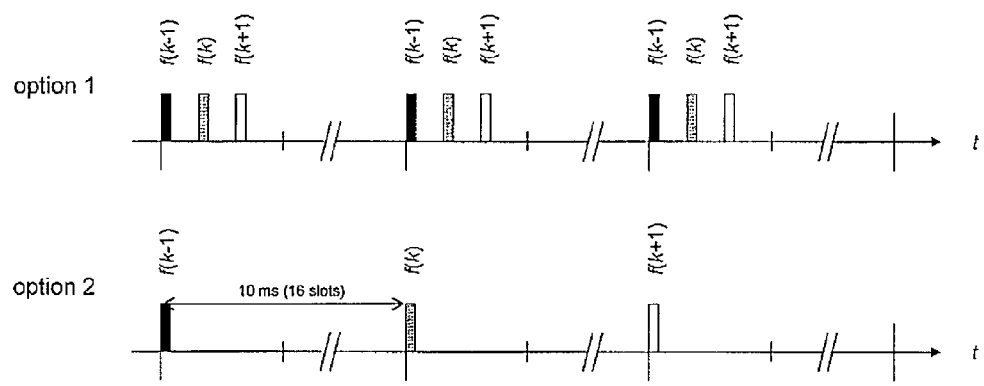
FIG. 18 illustrates two options for increasing the frequency span of a master unit; either three ID packets in one master-to-slave slot or three ID packets distributed over three master-to slave slots.

Sending on three frequencies may be done in two different ways, see FIG. 18. In option 1, three ID packets per 625 μs slot are sent. Since the ID packet length is 68 μs, there is 625/3−68 μs≈140 μs to switch the synthesizer. This is sufficient for modern fractional-N synthesizers (which need about 50 μs to switch frequencies). The duty cycle of the slow recovery page would, however, increase by a factor of 3. Option 2 may follow the Bluetooth timing somewhat more closely. However, the three frequencies may not be caught in a single 11.25 ms scan window. The time sliding effect as discussed above may solve this provided a proper ΔT is applied.

Figures 19, 20:
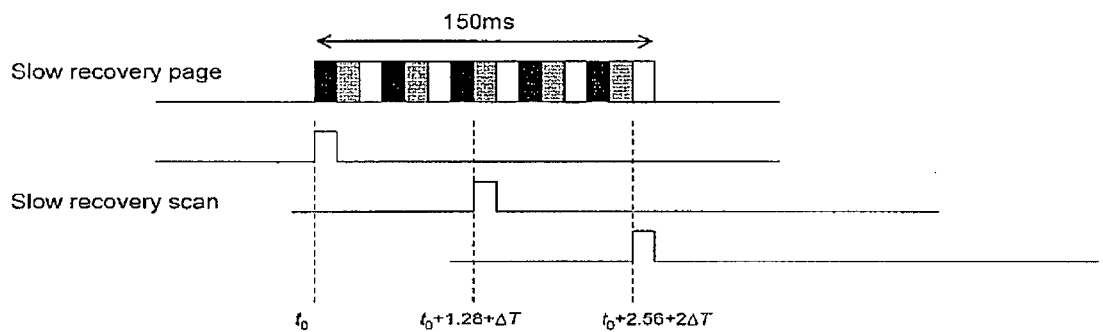
FIG. 19 shows required scan intervals in case of the slow recover page option 2 illustrated in FIG. 18.
FIG. 20 is a table with latency values for options 1 and 2 shown in FIG. 18 as well as a Bluetooth page.

For option 1, a single scan window of 11.25 ms may cover 3 frequencies. In that case, the initial interval increases of ΔT=150 ms may be kept. If option 2 is applied, a single scan window only covers a single frequency. Three scans are required to cover 3 frequencies, see FIG. 19. The timing offset ΔT may preferably be an integer number times 10 ms, but no integer multiple of 30 ms (since that would equal the repetition of the triple frequencies in the slow recovery page). FIG. 19 shows that a maximum of ΔT=70 ms may advantageously be used in case of option 2. Smaller ΔT values (but excluding 30 ms and 60 ms) can also be applied. This may improve the robustness at the expense of increasing the latency.

Compatibility with Bluetooth Page

Preferably, the slave unit 110 in slow recovery scan state should also be susceptible to normal Bluetooth paging. This may be automatically guaranteed if ΔT is an integer multiple of 10 ms. In that case, the scan window will slide over the conventional Bluetooth page trains.

Latency in Slow Recovery

Using a scan repetition period which is compatible with both the slow recovery page schemes (shown in FIGS. 17 and 18) and with the normal Bluetooth page, the latency may now be determined for the different cases. For the 3-ID packet scheme of option 1 and ΔT=150 ms, the maximum latency may be about 10 s. Maximally 8 steps may be needed to slide through the sleep period of 1.28 s−$N_{rp\_max}$·10 ms. For the three times one-ID packet scheme of option 2 and ΔT=70 ms, 17 steps may be needed to slide through the sleep period. Thereafter, up to two additional steps to slide through the 30 ms window containing the three frequencies may be needed. This leads to 19·1.28 s≈24 s. Finally, for the normal Bluetooth page, there may be similar results as in the conventional page scan mode. FIG. 20 shows as table, which summarizes the maximum and average response times once the units 100, 110 are within range and no errors occur.

In this disclosure, some embodiments have been described which may allow for improvements to the current Bluetooth sniff mode. A recovery procedure has been defined in order to improve the user experience of Bluetooth enabled units 100, 110 considerably. If the link is lost during Bluetooth sniff mode, the units 100, 110 may try to reconnect automatically using a low duty cycle recovery procedure. The recovery procedure may reuse the page frequency hopping sequence and the DAC ID packets as used in the conventional Bluetooth page procedure. A fast recovery may reconnect the two units 100, 110 within an average delay of about 640 ms when they are brought into range again. The fast recovery state may last for about 30 minutes (assuming a worst-case mutual drift of 40 ppm). During fast recovery, the duty cycle of the former slave unit 110 may be increased to 0.9%, the same as for a conventional page scan. The slave unit 110 may apply conventional page scan techniques (same page hopping scheme, same page scan window of 11.25 ms) but may, instead, use the clock information of the former master unit 100. In fast recovery scan state, the slave unit 110 may also be susceptible to conventional page messages using the standard Bluetooth page procedure. The duty cycle of the former master unit may increase over the 30 minutes window starting at 0.02% and rising to 0.3% at maximum. The master unit 100 may send ID packets including the slave's DAC. As time passes, the master unit 100 intensifies the repetition of ID transmissions. If no reconnection happens within e.g. 30 minutes, the units enter a slow recovery state. The duty cycle of the former master unit 100 is not further increased but remains at 0.3%. The duty cycle of the slave unit may remain at 0.9%; however, the scan period of the slave unit 110 may be increased to force a time sliding effect with the master recovery page transmissions. This may result in a longer delay when the units 100, 110 are within range (average delay in the order of 12 seconds) but will keep the units 100, 110 at low duty cycle. In slow recovery scan state, the slave unit 110 will also be susceptible to a conventional Bluetooth page messages. The slow recovery may carry on for more than 13 hours before FH synchronization is lost (again, assuming a worst-case mutual drift of 40 ppm). If the link has not been reconnected within this time, the units 100, 110 may return to conventional Bluetooth page scan (or turn off themselves, requiring a user action to start up again). In practical applications, the units would leave the slow recovery scheme much earlier (like 8 hours). The procedures described in this disclosure are quite general. However, if different clock accuracies are assumed, the final values will change. Larger inaccuracies will result in longer delays and/or larger duty cycles which translate into more power consumption.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof. Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The foregoing has described the principles and modes of operation of an embodiment of the present invention. In particular, the foregoing has described the principles of recovering a previously lost connection or link 120 between a master unit 100 and a slave unit 11 in Bluetooth. For example, the exemplary embodiment described herein is applied to a system. However, the detailed description should be regarded as illustrative rather than restrictive, and not as being limited to the particular preferred and disclosed embodiments discussed above. The person skilled in the art will, for example, readily appreciate that the various devices making up such system, e.g. master unit(s) and slave unit(s), are of course also separately covered by the present disclosure. The scope of the invention is given by the appended claims. It should be appreciated that variations may be made in the embodiments described herein by persons skilled in the art without departing from the scope of the present invention as defined by the appended claims.

We claim:

1. A method performed by a master unit for recovering a previously lost connection between said master unit and a slave unit in a frequency hopping communications system, the method comprising:
   causing the master unit to enter a first recovery state, which includes:
      repeatedly transmitting at least one ID packet from the master unit to the slave unit until a response is received from the slave unit or until a maximum time period of the first recovery state has elapsed, and
      gradually increasing the number of ID packets that are repeatedly transmitted from the master unit to the slave unit as time progresses, and wherein, if the maximum time period of the first recovery state has elapsed, the method further comprises:
   causing the master unit to enter a second recovery state, which includes:
      fixing the number of ID packets that are repeatedly transmitted from the master unit to the slave unit as time progresses to a maximum number of ID packets; and
      repeatedly transmitting the fixed number of ID packets from the master unit to the slave unit until a response is received from the slave unit, and wherein a timing selection and/or a frequency selection is performed based on clock information of the master unit from the last synchronization of the respective clocks of the master unit and the slave unit during the previous connection.

2. The method according to claim 1, wherein the step of causing the master unit to enter the first recovery state begins immediately after a loss of connection between the master unit and the slave unit has been detected.

3. The method according to claim 1, wherein the initial timing of transmitting the at least one ID packet is determined based on former anchor point timing during the previous connection between the master unit and the slave unit.

4. The method according to claim 1, wherein the at least one ID packet is associated with the identity of said slave unit.

5. The method according to claim 1, wherein the step of gradually increasing the number of ID packets that are repeatedly transmitted from the master unit to the slave unit as time progresses is performed until a maximum number of ID packets is reached.

6. The method according to claim 1, comprising:
   gradually increasing a number $N_{rp}$ of master-to-slave slots as time progresses, wherein each master-to-slave slot comprises the at least one ID packet, whereby the number $N_{rp}$ of master-to-slave slots each comprising the at least one ID packet is increased and thereby also the number of ID packets that are repeatedly transmitted from the master unit to the slave unit is increased as time progresses.

7. The method according to claim 6, wherein the number $N_{rp} \geq 1$, and wherein, the number $N_{rp}$ of master-to-slave slots is gradually increased until a maximum number $N_{rp}$ of master-to-slave slots is reached.

8. The method according to claim 7, wherein the maximum number $N_{rp}$ of master-to-slave slots equals 15.

9. The method according to claim 7, wherein the maximum number $N_{rp}$ of master-to-slave slots equals 127.

10. The method according to claim 1, wherein the clock information utilized by the master unit is the same as the clock information utilized by the master unit during the last synchronization of the respective clocks of the master unit and slave unit during the previous connection.

11. The method of claim 1, wherein the frequency hopping communications system is a Bluetooth system in Bluetooth Sniff mode.

12. A master unit for recovering a previously lost connection between said master unit and a slave unit in a frequency hopping communications system, the master unit comprising:
   a controller configured to cause the master unit to enter a first recovery state;
   a transceiver configured to transmit at least one ID packet from the master unit to the slave unit until a response is received from the slave unit or until a maximum time period of the first recovery state has elapsed,
   wherein:
   the transceiver is further configured to gradually increase the number of ID packets that are repeatedly transmitted from the master unit to the slave unit as time progresses,
   the controller is further configured to cause the master unit to enter a second recovery state when the maximum time period of the first recovery state has elapsed,
   the transceiver includes a baseband processor configured to fix the number of ID packets that are repeatedly transmitted from the master unit to the slave unit as time progresses to a maximum number ID packets, and to repeatedly transmit the fixed number of ID packets from the master unit to the slave unit until a response is received from the slave unit, and
   a clock configured to determine a timing selection and/or a frequency selection by utilizing clock information from the last synchronization of respective clocks of the master unit and the slave unit during the previous connection.

13. The master unit according to claim 12, wherein the controller is configured to begin its operation immediately after a loss of connection between the master unit and the slave unit has been detected.

14. The master unit according to claim 12, wherein the transceiver is further configured to determine an initial timing for transmitting the at least one ID packet, wherein the initial timing is determined based on a former anchor point timing during the previous connection between the master unit and the slave unit.

15. The master unit according to claim 12, wherein the at least one ID packet is associated with the identity of said slave unit.

16. The master unit according to claim 12, wherein the transceiver is configured to gradually increase said number of ID packets until a maximum number of ID packets is reached.

17. The master unit according to claim 12, wherein the transceiver is further configured to increase a number $N_{rp}$ of master-to-slave slots as time progresses, wherein each master-to-slave slot comprises the at least one ID packet, whereby the number $N_{rp}$ of master-to-slave slots each comprising the at least one ID packet can be increased and thereby also the number of ID packets that are repeatedly transmitted from the master unit to the slave unit can be increased as time progresses.

18. The master unit according to claim 17, wherein the number $N_{rp} \geq 1$, and wherein the transceiver is configured to gradually increase said number $N_{rp}$ until a maximum is reached.

19. The master unit according to claim 18, wherein the maximum number $N_{rp}$ of master-to-slave slots equals 15.

20. The master unit according to claim 18, wherein the maximum number $N_{rp}$ of master-to-slave slots equals 127.

21. The master unit according to claim 12, wherein the clock information utilized by the master unit is the same as the clock information utilized by the master unit during the last synchronization of the respective clocks of the master unit and slave unit during the previous connection.

22. The master unit according to claim 12, wherein the frequency hopping communications system is a Bluetooth system in Bluetooth Sniff mode.

23. A method performed by a slave unit for assisting in recovering a previously lost connection between said slave unit and a master unit of a frequency hopping communications system, the method comprising the steps of:
  causing the slave unit to enter a first recovery state, which includes:
    activating the slave unit for a first activation time period out of every first standby time period;
    during each first activation time period causing the slave unit to monitor a selected channel for receipt of an ID packet from the master unit until said ID packet is received by the slave unit or until a maximum time period of the first recovery state has elapsed; and if the maximum time period of the first recovery state has elapsed, the method comprises the further steps of:
  causing the slave unit to enter a second recovery state, which includes:
    activating the slave unit for a second activation time period out of every second standby time period, wherein said second standby time period is different from said first standby time period;
    during each second activation time period causing the slave unit to monitor a selected channel for receipt of an ID packet from the master unit until said ID packet is received by the slave unit; and wherein an initial timing selection and/or frequency selection of the first activation time period is determined by utilizing clock information from a clock of the master unit from the last synchronization of the respective clocks of the master unit and the slave unit during the previous connection.

24. The method according to claim 23, wherein the step of causing the slave unit to enter the first recovery state is performed immediately after a loss of connection between the master unit and the slave unit has been detected.

25. The method according to claim 23, wherein the at least one ID packet is associated with the identity of said slave unit.

26. The method according to claim 23, further comprising:
  utilizing the same clock offset as during the last synchronization of the respective clocks of the master unit and the slave unit during the previous connection.

27. The method according to claim 23, wherein the first and the second activation time periods has a total duration D being defined by two equal durations D/2 on both sides of a duration center C of the duration D, the method further comprising:
  selecting the duration center C of said time period to be placed at a former anchor point of a former anchor point timing experienced during the previous connection between the master unit and the slave unit.

28. The method according to claim 23, wherein the step of causing the slave unit to enter the second recovery state is performed immediately after the maximum time period has elapsed.

29. The method according to claim 23, wherein during the second recovery state, a fixed offset is applied to the period between two consecutive activation periods in such way that the instances when the activation periods occur begins to slide with respect to former anchor points.

30. The method according to claim 23, further comprising:
  during the second recovery state, causing the slave unit to monitor the selected channel for receipt of an ID packet from the master unit until said ID packet is received by the slave unit, wherein the selection of scan frequencies is based on the timing selection of the first standby period.

31. The method according to claim 23, wherein the frequency hopping communications system is a Bluetooth system in Bluetooth Sniff mode.

32. A slave unit for assisting in recovering a previously lost connection between said slave unit and a master unit in a frequency hopping communications system, the slave unit comprising:
  a controller configured to cause the slave unit to enter a first recovery state and to activate the slave unit for a first activation time period out of every first standby time period; and
  a transceiver configured to monitor a selected channel for receipt of an ID packet from the master unit during each first activation time period until said ID packet is received by the slave unit or until a maximum time period of the first recovery state has elapsed; wherein:
  the controller is further configured to cause the slave unit to enter a second recovery state if the maximum time period of the first recovery state has elapsed and to activate the slave unit for a second activation time period out of every second standby time period, wherein said second standby time period is different from said first standby time period;
  the transceiver is further configured to monitor a selected channel for receipt of an ID packet from the master unit during each second activation time period until said ID packet is received by the slave unit; and a clock configured to determine an initial timing selection and/or frequency selection of the first activation time period by utilizing clock information from a clock of the master unit from the last synchronization of the respective clocks of the master unit and the slave unit during the previous connection.

33. The slave unit according to claim 32, wherein the controller is configured to begin its operation immediately after a loss of connection between the master unit and the slave unit has been detected.

34. The slave unit according to claim 32, wherein the at least one ID packet is associated with the identity of said slave unit.

35. The slave unit according to claim 32, wherein the clock is further configured to utilize the same clock offset as during the last synchronization of the respective clocks of the master unit and the slave unit during the previous connection.

36. The slave unit according to claim 32, wherein:
the controller is further configured to determine the first and the second activation time period to have a total duration D being defined by two equal durations D/2 on both sides of a duration center C of the duration D; and
to select the duration center C of said time period to be placed at a former anchor point of a former anchor point timing experienced during the previous connection between the master unit and the slave unit.

37. The slave unit according to claim 32, wherein the controller is further configured to cause the slave unit to enter the second recovery state immediately after the maximum time period has elapsed.

38. The slave unit according to claim 32, wherein the controller is further configured to apply a fixed offset to the period between two consecutive activation periods during the second recovery state, in such way that the instances when the activation periods occur begins to slide with respect to former anchor points.

39. The slave unit according to claim 32,
wherein the transceiver is further configured to cause, during the second recovery state, the slave unit to monitor the selected channel for receipt of an ID packet from the master unit until said ID packet is received by the slave unit, wherein the selection of scan frequencies is based on the timing selection of the first standby period.

40. The slave unit according to claim 32, wherein the frequency hopping communications system is a Bluetooth system in Bluetooth Sniff mode.

41. A method for recovering a previously lost connection between a master unit and a slave unit in a frequency hopping communications system, the method comprising the steps of:
causing the slave unit to enter a first recovery state, which includes:
activating the slave unit for a first activation time period out of every first standby time period;
during each first activation time period causing the slave unit to monitor a selected channel for receipt of an ID packet from the master unit until said ID packet is received by the slave unit or until a maximum time period of the first recovery state has elapsed; and
causing the master unit to enter the first recovery state, which includes:
repeatedly transmitting at least one ID packet from the master unit to the slave unit until a response is received from the slave unit or until the maximum time period of the first recovery state has elapsed, wherein the number of ID packets that are repeatedly transmitted from the master unit to the slave unit are gradually increased as time progresses; wherein if the maximum time period of the first recovery state has elapsed, the method additionally comprises the steps of:
causing the slave unit to enter a second recovery state, which includes:
activating the slave unit for a second activation time period out of every second standby time period, wherein said second standby time period is different from said first standby time period;
during each second activation time period causing the slave unit to monitor a selected channel for receipt of an ID packet from the master unit until said ID packet is received by the slave unit; and
causing the master unit to enter the second recovery state, which includes:
repeatedly transmitting at least one ID packet from the master unit to the slave unit, until a response is received from the slave unit, and wherein
an initial timing selection and/or frequency selection of the first activation time period is determined by utilizing clock information from the last synchronization of the respective clocks of the master unit and the slave unit during the previous connection.

42. The method according to claim 41, further comprising, during the second recovery state, fixing the number of ID packets that are repeatedly transmitted from the master unit to the slave unit as time progresses to a maximum number of ID packets.

43. The method according to claim 41, wherein the step of causing the slave unit and/or master unit to enter the first recovery state is performed immediately after a loss of connection between the master unit and the slave unit has been detected.

44. The method according to claim 41, wherein the step of causing the master unit to enter the first recovery state is performed immediately after a loss of connection between the master unit and the slave unit has been detected.

45. The method according to claim 41, wherein the clock information utilized by the master unit is the same as the clock information utilized by the master unit during the last synchronization of the respective clocks of the master unit and slave unit during the previous connection.

46. The method according to claim 45, wherein the slave unit is caused to utilize the same clock offset as during the last synchronization of the respective clocks of the master unit and the slave unit during the previous connection.

47. The method according to claim 46, wherein first activation time period has a total duration D being defined by two equal durations D/2 on both sides of a duration center C of the duration D, the method further comprising:
selecting the duration center C of said time period to be placed at a former anchor point of a former anchor point timing experienced during the previous connection between the master unit and the slave unit.

48. The method according to claim 41, wherein a number $N_{rp}$ of master-to-slave slots is gradually increased as time progresses, where each master-to-slave slot comprises the at least one ID packet, whereby the number $N_{rp}$ of master-to-slave slots each comprising the at least one ID packet is increased and thereby also the number of ID packets that are repeatedly transmitted from the master unit to the slave unit is increased as time progresses.

49. The method according to claim 48, wherein the number $N_{rp} \geq 1$, and wherein, the number of $N_{rp}$ of master-to-slave slots is gradually increased until the total number $N_{rp}$ until a maximum is reached.

50. The method according to claim 49, wherein the maximum number $N_{rp}=15$.

51. The method according to claim 49, wherein the maximum number $N_{rp}=127$.

52. The method according to claim 41, wherein the step of causing the slave unit and/or master unit to enter the second recovery state is performed immediately after the maximum time period has elapsed.

53. The method according to claim 41, wherein the hopping sequence is a pseudo-random sequence.

54. The method according to claim 41, wherein the pseudo-random sequence is determined by an address of the slave unit.

55. The method according to claim 41, wherein both the first and the second recovery state are low duty cycle states.

56. The method according to claim 41, wherein the frequency hopping communications system is a Bluetooth system in Bluetooth Sniff mode.

\* \* \* \* \*